(12) United States Patent
Wakai

(10) Patent No.: US 7,898,566 B2
(45) Date of Patent: Mar. 1, 2011

(54) VIDEO PROCESSING APPARATUS AND OBJECT IDENTIFYING METHOD

(75) Inventor: Masanori Wakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1233 days.

(21) Appl. No.: 11/503,994

(22) Filed: Aug. 15, 2006

(65) Prior Publication Data

US 2007/0040902 A1 Feb. 22, 2007

(30) Foreign Application Priority Data

Aug. 22, 2005 (JP) .............................. 2005-240197

(51) Int. Cl.
*H04N 7/14* (2006.01)
(52) U.S. Cl. ................ 348/14.08; 348/14.1; 348/14.09; 715/753
(58) Field of Classification Search ... 348/14.01–14.16; 715/753, 755, 751
See application file for complete search history.

(56) References Cited

U.S. PATENT DOCUMENTS

2003/0197779 A1* 10/2003 Zhang et al. .............. 348/14.16
2005/0275716 A1* 12/2005 Shingu et al. ............ 348/14.13

FOREIGN PATENT DOCUMENTS

| JP | 11-175517 | | 7/1999 |
| JP | 2000023123 | A * | 1/2000 |
| JP | 2001-128057 | | 5/2001 |
| JP | 2004-080750 | | 3/2004 |
| JP | 2004-208188 | | 7/2004 |
| JP | 2005-051778 | | 2/2005 |

* cited by examiner

*Primary Examiner*—Melur Ramakrishnaiah
(74) *Attorney, Agent, or Firm*—Fitzpatrick, Cella, Harper & Scinto

(57) ABSTRACT

Photographs an action performed to an object with an appliance by a photographing device, and records it as video data. When a desired object is specified while the video data is being played back, the object is identified based on information on a position of the object in the appliance and a time the object acted, and operation predetermined against the identified object is enabled.

5 Claims, 37 Drawing Sheets

FIG. 6

| APPLIANCE | OBJECT | TIME | ACTION | X1 | Y1 | X2 | Y2 | |
|---|---|---|---|---|---|---|---|---|
| DISPLAY DEVICE 301 | STILL IMAGE 1a | 2005/05/09 10:35:12 | DISPLAY | 20 | 50 | 450 | 100 | ← 601 |
| DISPLAY DEVICE 301 | STILL IMAGE 1b | 2005/05/09 10:35:23 | DISPLAY | 0 | 250 | 400 | 300 | ← 602 |
| .. | .. | .. | .. | .. | .. | .. | .. | |
| DISPLAY DEVICE 302 | PRESENTATION MATERIALS 2a | 2005/05/09 10:41:15 | DISPLAY | 50 | 150 | 200 | 230 | ← 603 |
| .. | .. | .. | .. | .. | .. | .. | .. | |
| DISPLAY DEVICE 301 | STILL IMAGE 1a | 2005/05/09 10:45:20 | NON-DISPLAY | | | | | ← 604 |
| .. | .. | .. | .. | .. | .. | .. | .. | |
| DISPLAY DEVICE 302 | PRESENTATION MATERIALS 2a | 2005/05/09 10:46:18 | MOVE | 150 | 150 | 300 | 230 | ← 605 |
| DISPLAY DEVICE 303 | MOVING IMAGE 3a | 2005/05/09 10:47:06 | DISPLAY | 300 | 310 | 380 | 380 | ← 606 |
| DISPLAY DEVICE 302 | PRESENTATION MATERIALS 2a | 2005/05/09 10:48:00 | NON-DISPLAY | | | | | ← 607 |
| .. | .. | .. | .. | .. | .. | .. | .. | |
| .. | .. | .. | .. | .. | .. | .. | .. | |

| APPLIANCE | TIME | ACTION | PHYSICAL SIZE | | POSITION SHAPE ON VIDEO | | | | | | | |
|---|---|---|---|---|---|---|---|---|---|---|---|---|
| | | | | | UPPER LEFT | | LOWER LEFT | | UPPER RIGHT | | LOWER RIGHT | |
| | | | WIDTH | HEIGHT | X | Y | X | Y | X | Y | X | Y |
| DISPLAY DEVICE 302 | 2005/01/01 00:00:00 | SETUP | 640 | 480 | 115 | 8 | 115 | 42 | 160 | 8 | 160 | 42 |
| DISPLAY DEVICE 301 | 2005/02/01 00:00:00 | SETUP | 3200 | 900 | 0 | 10 | 6 | 39 | 107 | 10 | 107 | 39 |
| DISPLAY DEVICE 303 | 2005/02/01 00:00:00 | SETUP | 1280 | 960 | 166 | 10 | 166 | 40 | 222 | 15 | 216 | 65 |
| .. | .. | .. | .. | .. | .. | .. | .. | .. | .. | .. | .. | .. |
| DISPLAY DEVICE 301 | 2005/03/01 00:00:00 | REMOVE | | | | | | | | | | |
| DISPLAY DEVICE 303 | 2005/03/11 10:53:20 | MOVE | 1280 | 960 | 176 | 10 | 176 | 40 | 222 | 15 | 216 | 65 |
| .. | .. | .. | .. | .. | .. | .. | .. | .. | .. | .. | .. | .. |

1101 — UPPER LEFT
1102 — LOWER LEFT
1103 — UPPER RIGHT
1104 — (header region)
1105 — LOWER RIGHT

F I G. 20

| APPLIANCE | OBJECT | TIME | ACTION | PRINT TRAY | |
|---|---|---|---|---|---|
| PRINT DEVICE 1904 | STILL IMAGE 4a | 2005/05/09 10:37:22 | PRINT | a | ~2001 |
| PRINT DEVICE 1905 | PRESENTATION MATERIALS 4b | 2005/05/09 10:37:52 | PRINT | b | ~2002 |
| PRINT DEVICE 1904 | Web PAGE 5a | 2005/05/09 10:38:59 | PRINT | a | ~2003 |
| PRINT DEVICE 1904 | STILL IMAGE 4a | 2005/05/09 10:40:11 | RECEIVE | a | ~2004 |
| . . | . . | . . | . . | . . | |
| PRINT DEVICE 1904 | ESTIMATE SHEET | 2005/05/09 10:37:22 | PRINT | a | ~2005 |
| . . | . . | | . . | . . | |

FIG. 22

| APPLIANCE | OUTPUT TRAY | TIME | ACTION | POSITION SHAPE ON VIDEO | | | | | | | |
|---|---|---|---|---|---|---|---|---|---|---|---|
| | | | | UPPER LEFT | | LOWER LEFT | | UPPER RIGHT | | LOWER RIGHT | |
| | | | | X | Y | X | Y | X | Y | X | Y |
| PRINT DEVICE 1405 | a | 2005/01/01 00:00:00 | SETUP | # | # | # | # | # | # | # | # |
| PRINT DEVICE 1405 | b | 2005/02/01 00:00:00 | SETUP | # | # | # | # | # | # | # | # |
| PRINT DEVICE 1404 | a | 2005/02/01 00:00:00 | SETUP | # | # | # | # | # | # | # | # |
| PRINT DEVICE 1404 | b | 2005/02/01 00:00:00 | SETUP | # | # | # | # | # | # | # | # |
| .. | .. | .. | .. | .. | .. | .. | .. | .. | .. | .. | .. |
| PRINT DEVICE 1404 | b | 2005/03/01 00:00:00 | REMOVE | # | # | | | | | | |
| PRINT DEVICE 1405 | b | 2005/03/22 10:53:20 | MOVE | # | # | # | # | # | # | # | # |
| .. | .. | .. | .. | .. | .. | .. | .. | .. | .. | .. | .. |

2201, 2202, 2203, 2204, 2205, 2206

VIDEO PROCESSING APPARATUS AND OBJECT IDENTIFYING METHOD

BACKGROUND OF THE INVENTION

1. Field of the Invention

The present invention relates to a video processing apparatus and an object identifying of photographing an action performed to an object with an appliance by a photographing device, recording it as video data, and playing back the video data.

2. Description of the Related Art

There has been an increase in the need to film (video-capture) operation or conference contents which are performed in a working position, a conference room or the like by using appliances such as a display, a printer or the like, and use the filmed (captured) video as a record of the operation or a record of the conference. In such a case, it has been needed to improve convenience in searching for a target object from a lengthy video and various techniques for that purpose have been proposed (for example, prior art references 1-5).

Prior art reference 1 intends to search a particular participant's statement from a photographed conference video. Reference 1 discloses a technology of identifying remarks/voice of a particular participant in a video-captured meeting. The technology has the participant him/herself set the target, thereby eliminating erroneous recognition and labor of manual setting by the operator.

Prior art reference 2 intends to extract a reusable graphic object from a usual white board. It extracts a drawn graphic object from capture data on a white board in a photographed video. Accordingly, the graphic object can be associated with audio data which works together on a time axis.

Prior art reference 3 intends to create minutes of a television conference held at many positions in a form by which the source of the information can be determined. It can indicate the position the information transmitted from and the order of transmission.

Prior art reference 4 is adapted to perform enlargement of an image in a specified region by associating live images captured by a plurality of cameras with the cameras photographing the images, without involving the cameras.

Prior art reference 5 is adapted to transfer data to an appliance capturing a live video or to transfer data from the appliance by using a camera recognizing the appliance.

Prior art references 1 to 5 are shown below.

Prior Art Reference 1: Japanese Patent Laid-Open No. 2004-208188

Prior Art Reference 2: Japanese Patent Laid-Open No. 2004-080750

Prior Art Reference 3: Japanese Patent Laid-Open No. 11-175517

Prior Art Reference 4: Japanese Patent Laid-Open No. 2001-128057

Prior Art Reference 5: Japanese Patent Laid-Open No. 2005-051778

In prior art reference 1, however, only a method for identifying a participant's video is disclosed, and a method for identifying an appliance and an object in the appliance is not focused on. Therefore, it cannot identify a display object on a display or a print object on a printer output tray.

In prior art reference 2, only a usual white board is targeted and a method for identifying an appliance or an object in the appliance is not focused on. Therefore, prior art reference 2 can neither identify a display object on a display or a print object on a printer output tray, for example.

Further, in prior art reference 3, a method for identifying an object in generated minutes of a conference is not disclosed. Therefore, prior art reference 3 can neither identify a display object on a display or a print object on a printer output tray, for example.

Further, in prior art reference 4, only a live video and a camera photographing the video are associated with each other and a method for identifying an appliance in the video or an object in the appliance is not focused on. Therefore, prior art reference 4 can neither identify a display object on a display or a print object on a printer output tray.

And, in prior art reference 5, a camera recognizes only an appliance in a video and a method for identifying an object in an appliance is not focused on. Further, a specific realizing method is not clear for recognizing an appliance in a video. Therefore, the prior art reference 5 can neither identify a display object on a display or a print object on a printer output tray.

SUMMARY OF THE INVENTION

The present invention is adapted in view of the above-mentioned problems and intends to enable identification of objects such as a display object on a display or a print object on a printer output tray, by identifying an appliance or an object in the appliance from a playback video.

It also intends to enable predetermined operation such as enlargement or printing for the identified object.

In order to achieve the abovementioned object, according to an aspect of the present invention, a video processing apparatus for photographing an action of performed to an object with an appliance by a photographing device, recording it as video data, and playing back the video data, comprising: identifying means for identifying an object based on information on a position of the object in the appliance and a time the object acted, when the object is specified while the video data is being played back; and operating means for enabling operation predetermined against the object identified by the identifying means is provided.

According to an aspect of the present invention, an object identifying method of video processing apparatus which photographs an action of performed to an object with an appliance by a photographing device, records it as video data, and plays back the video data, comprising: an identifying step of identifying an object based on information on a position of the object in the appliance and a time the object acted, when the object is specified while the video data is being played back; and an operating step of enabling operation predetermined against the object identified at the identifying step is provided.

Further features of the present invention will become apparent from the following description of exemplary embodiments with reference to the attached drawings.

BRIEF DESCRIPTION OF THE DRAWINGS

FIG. 6 is a diagram showing an example of an object action record data 306;

FIG. 11 is a diagram showing an example of an appliance position shape data 308;

FIG. 20 is a diagram showing an example of object action record data intending a printer;

FIG. 22 is a diagram showing an example of appliance position shape data of a printer;

DESCRIPTION OF THE EMBODIMENTS

The preferred embodiments for implementing the present invention will be described in detail with reference to the drawings.

Figure 1:
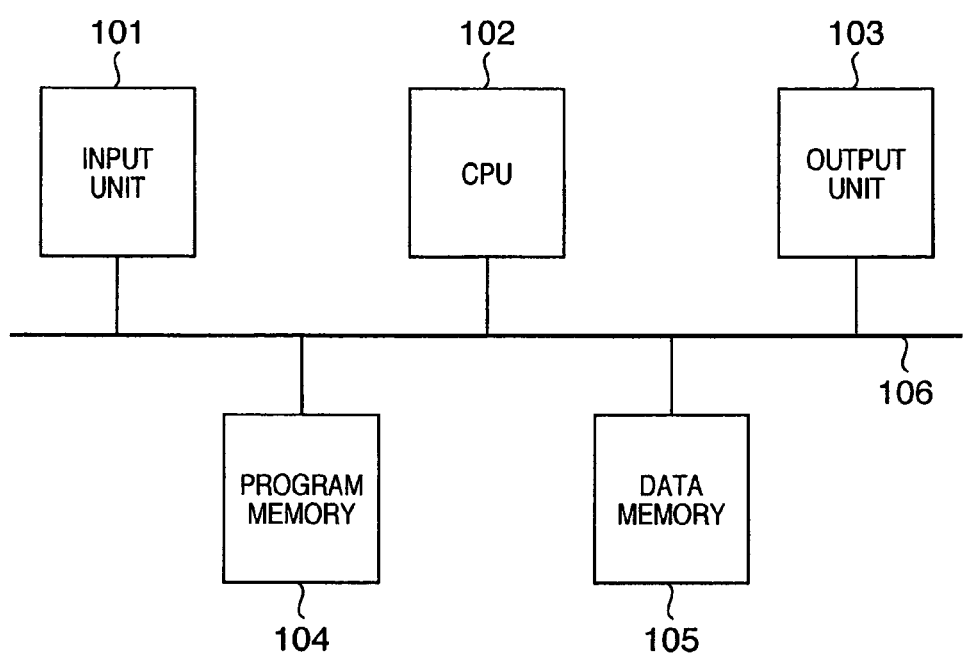
FIG. 1 is a block diagram showing a hardware configuration of information processing apparatus in an embodiment.

FIG. 1 is a block diagram showing a hardware configuration of information processing apparatus in an embodiment. In FIG. 1, the reference numeral 101 denotes an input unit for inputting information (data), and is connected to a photographing device or the like to be described later. The reference numeral 102 denotes a CPU, which performs calculation, logical determination or the like for various types of processing, and controls each component connected to a bus to be described later. The reference numeral 103 denotes an output unit for outputting information (data), and is connected to a video forming device including a display such as an LCD, a CRT or the like, a printer or the like to be described later, for example.

The reference numeral 104 denotes program memory, which is memory for storing a program which includes a processing procedure shown by the flowchart to be described later and which is for controlled by a CPU 102. The program memory 104 may be ROM, or may be RAM to which a program is loaded from an external storage device or the like. The reference numeral 105 denotes data memory and stores data generated in various types of processing. The data memory 105 is assumed to be RAM, for example, and it is loaded prior to processing from a non-volatile external storage medium, or referenced each time it is needed.

Then, the reference numeral 106 denotes a bus for transferring address signals for designating respective components to be controlled by the CPU 102, control signals for controlling respective components, and data which is exchanged among respective components.

First Embodiment

Here, by using FIG. 2 to FIG. 18, a case where a home appliance or an office appliance and an object in the appliance corresponding to a position in a time and a position in a space designated in the playback video are identified and operation such as enlarged display, printing or the like is executed will be described. In the term "an appliance", a home appliance and an office appliance are included (hereinafter simply referred to as an appliance). In a first embodiment, a case where particularly a target appliance is a display and an actual shape of a display (aspect ratio or the like) is not kept because of distortion due to the position of a camera or characteristics of a lens will be described.

Figure 2:
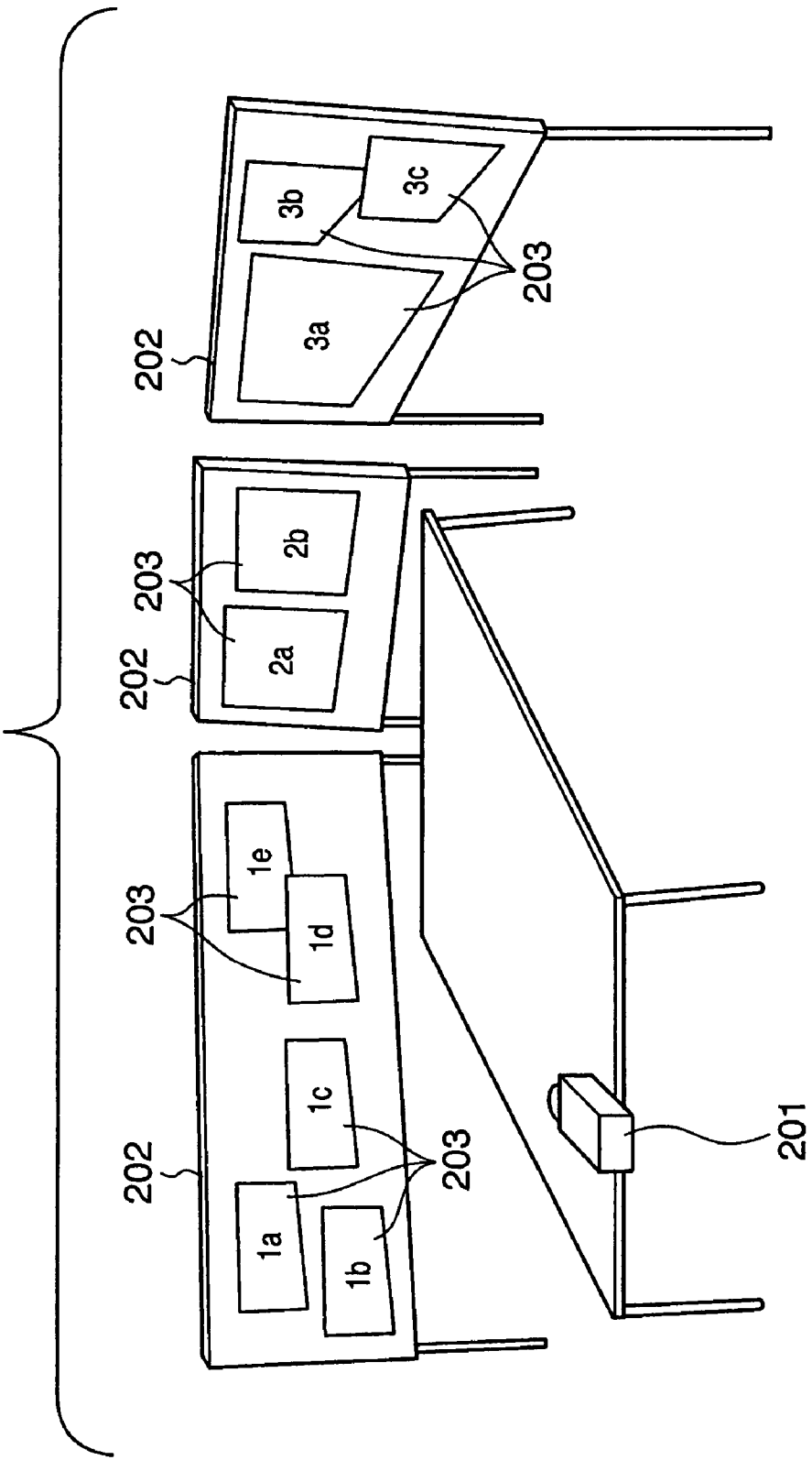
FIG. 2 is a diagram showing an example of a system video in a first embodiment.

FIG. 2 is a diagram showing an example of a system video in the first embodiment. The system shown in FIG. 2 visualizes a conference room, including three displays 202 with large screens, and a conference video photographing camera (hereinafter simply referred to as a camera) 201 which photographs a conference with an wide angle as well as a conference desk in a usual conference room. It is also shown that a plurality of display objects 203 are displayed on each screen on the displays 202.

Figure 3:
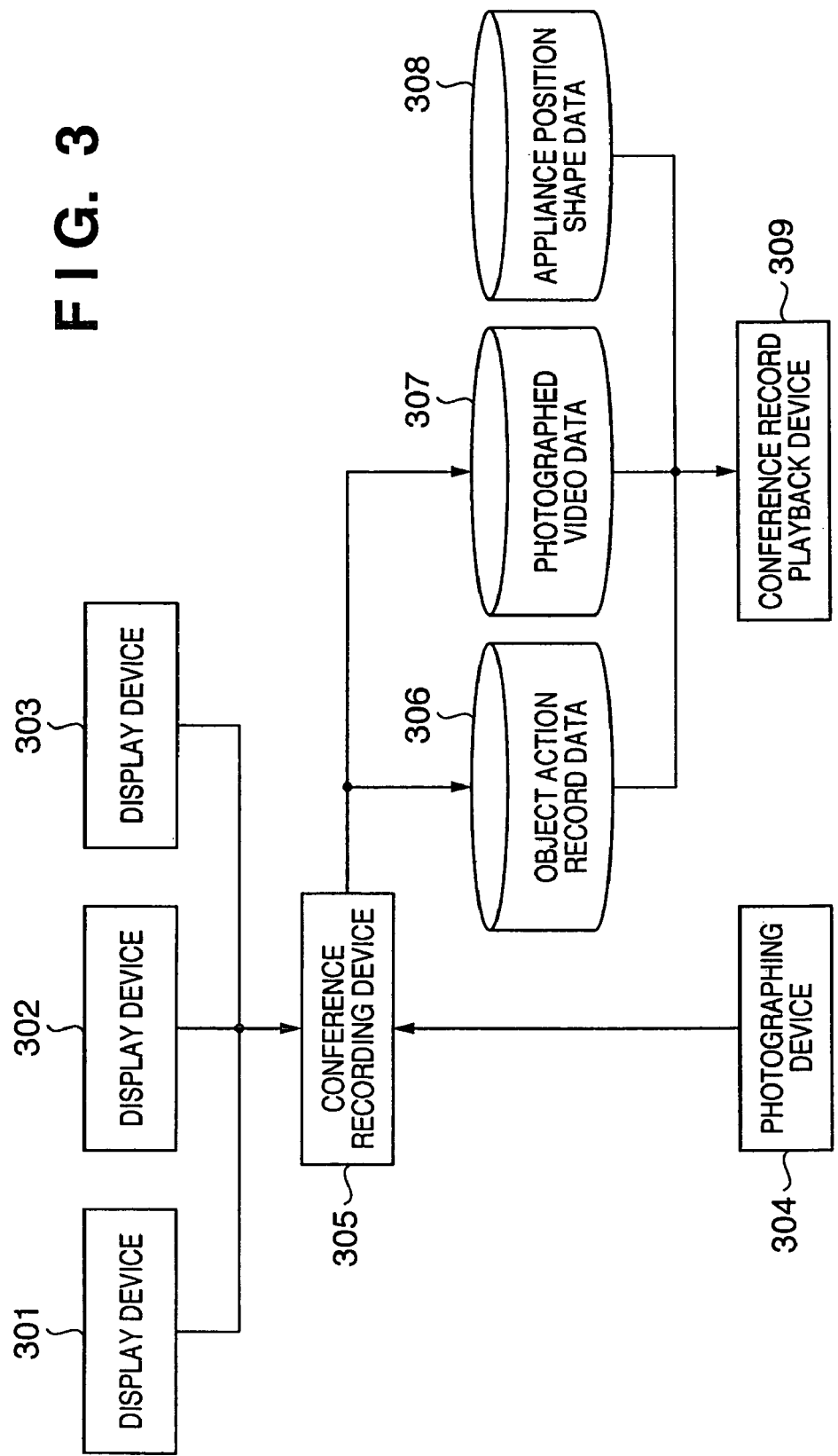
FIG. 3 is a system block diagram showing a configuration of a system video shown in FIG. 2 when it is realized.

FIG. 3 is a system block diagram showing a configuration when a system video shown in FIG. 2 is realized. As shown in FIG. 3, information on each display object displayed on display devices 301 to 303 is recorded as the object action record data 306 by a conference recording device 305. Like information on each display object, a video photographed by a photographing device 304 is also recorded as photographed video data 307.

The object action record data 306, the photographed video data 307 recorded in such a manner are played back by a conference record playback device 309 by referencing appliance position shape data 308 which records a position or a shape of each appliance in the photographed video.

In the first embodiment, the information processing apparatus shown in FIG. 1 functions as the conference recording device 305 and the conference record playback device 309 shown in FIG. 3 and specifically has functions of executing appliance position shape automatic setting or appliance position shape designation to be described later.

Figure 4:
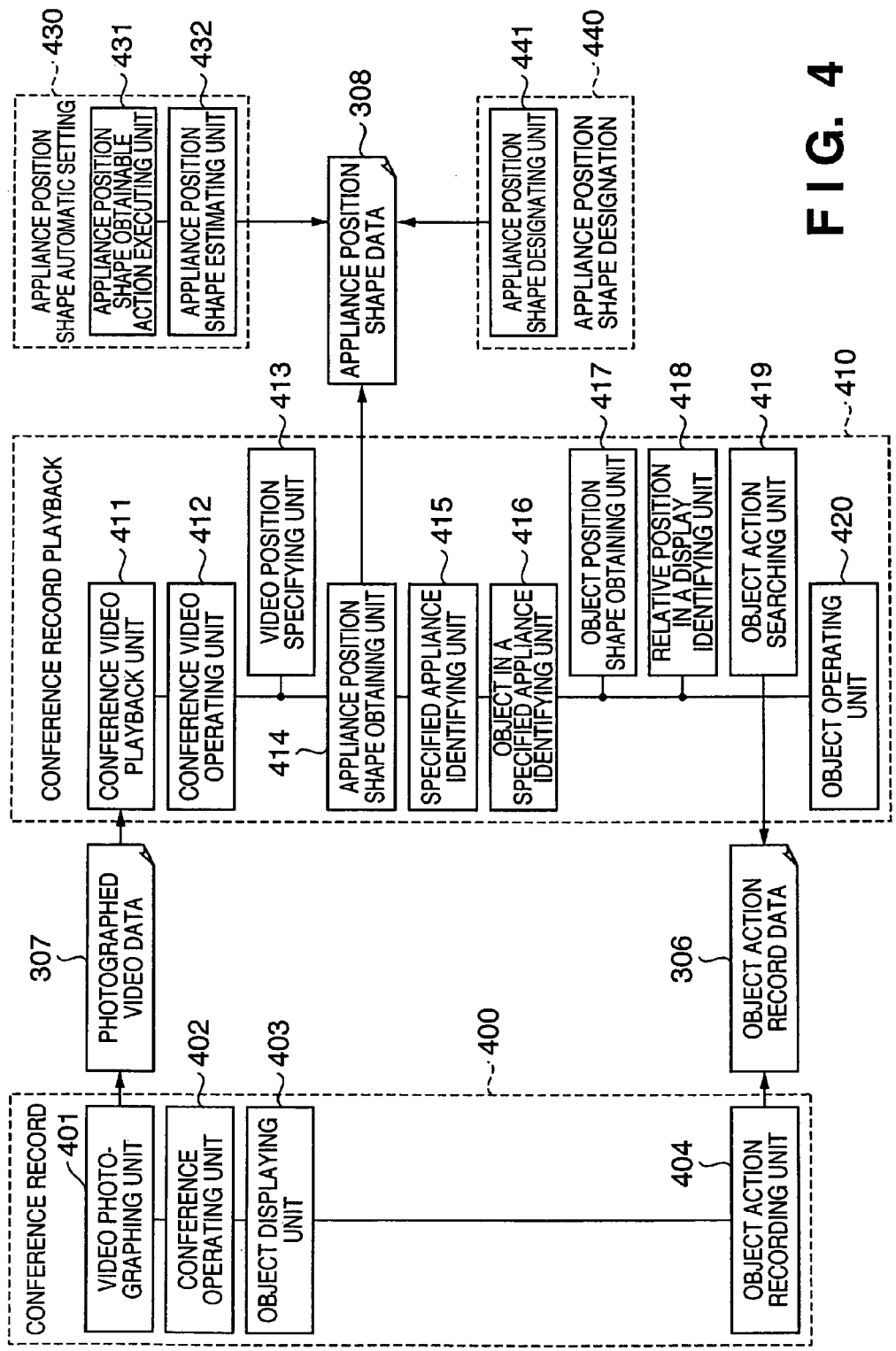
FIG. 4 is a functional block diagram showing a function of a conference recording device 305 and a conference record playback device 309 shown in FIG. 3.

FIG. 4 is a functional block diagram showing a function of the conference recording device 305 and the conference record playback device 309 shown in FIG. 3. As shown in FIG. 4, it consists of respective functions of a conference record 400 (corresponding to the conference recording device 305), a conference record playback 410 (corresponding to the conference record playback device 309), an appliance position shape automatic setting 430, and an appliance position shape designation 440. The conference record 400 provides a function of recording conference contents. The conference record playback 410 provides a function of playing back a recorded conference record. The appliance position shape automatic setting 430 provides a function of estimating an appliance position shape by causing the appliance to execute an action which involves change in a video. Then, the appliance position shape designation 440 provides a function of designating an appliance position shape needed to identify an object in the appliance from the playback video.

The conference record 400 consists of a video photographing unit 401, a conference operating unit 402, an object displaying unit 403, and an object action recording unit 404. The video photographing unit 401 records a conference photographed by the photographing device 304 as photographed video data 307. The conference operating unit 402 performs display designation of conference materials and designation to write into an electric white board. The object displaying unit 403 displays a display object according to the designation. The object action recording unit 404 records an action performed to the display object as the object action record data 306.

Next, the configuration of a conference record playback 410 will be described. It will be further detailed later. A conference video playback unit 411 plays back a conference video recorded as the abovementioned photographed video data 307. A conference video operating unit 412 operates a video being photographed. A video position specifying unit 413 specifies any position in a video. An appliance position shape obtaining unit 414 obtains an appliance position shape by using predefined appliance position shape data 308. A specified appliance identifying unit 415 identifies an appliance at a specified position. An object in a specified appliance identifying unit 416 identifies an object in an appliance at a specified position. An object position shape obtaining unit 417 obtains a position shape of a specified object. A relative position in a display identifying unit 418 identifies a relative position in a display corresponding to a specified position. An object action searching unit 419 searches an object action corresponding to a specified position. An object operating unit 420 operates a specified object.

An appliance position shape automatic setting 430 consists of an appliance position shape obtainable action executing unit 431 for causing an appliance to execute an action involving a change in a video, and an appliance position shape estimating unit 432 for automatically setting definition of the appliance position shape data 308 by analyzing a change in a video and estimating an appliance position shape. An appliance position shape designating unit 441 designates definition of the appliance position shape data 308.

Figure 5:
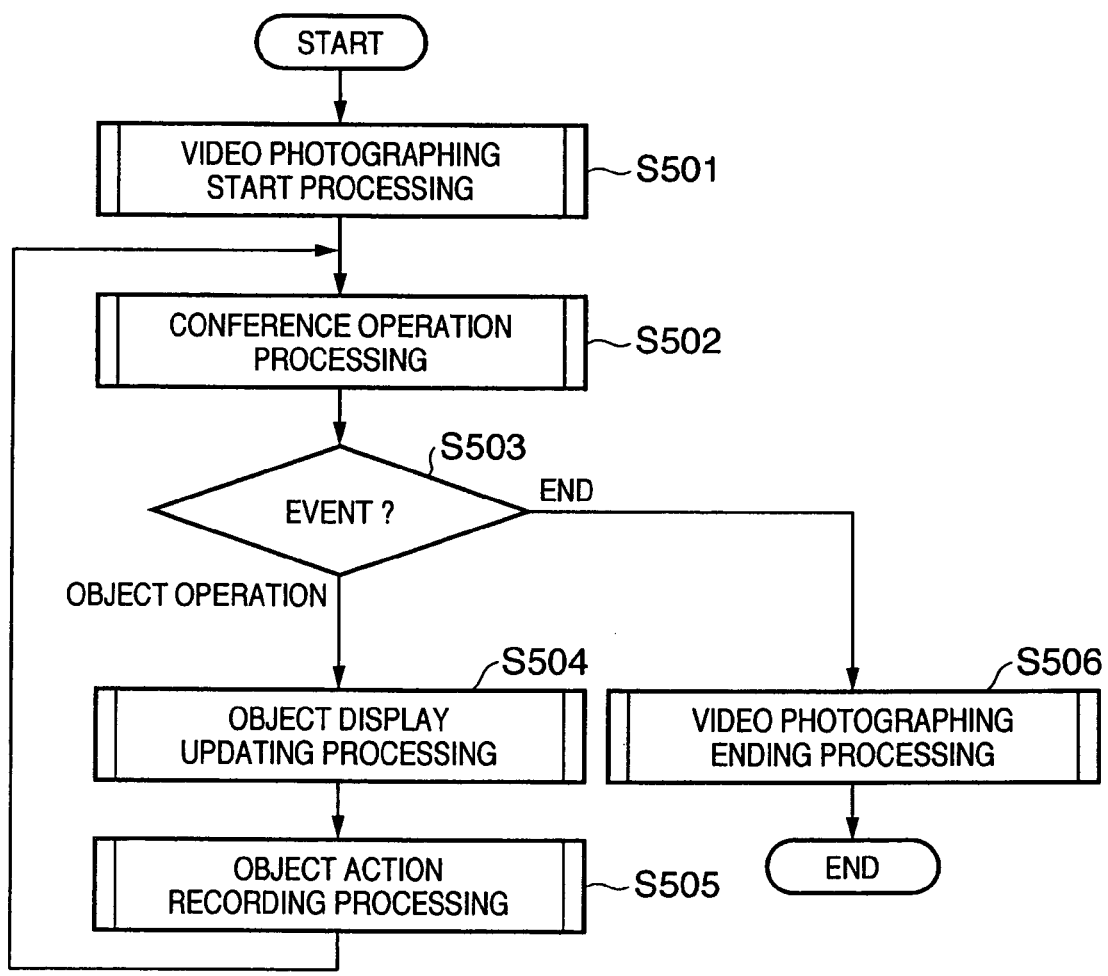
FIG. 5 is a flowchart showing a conference record processing in the first embodiment.

FIG. 5 is a flowchart showing conference record processing in the first embodiment. When the conference record 400 is designated to start photographing, recording of the photographed video data 307 starts at the step S501 (video photographing start processing). Then at the step S502, it receives user's operation (conference operation processing), and if it is determined as object operation designation at the next step S503, the operation proceeds to the step S504, and a corresponding object is updated in display (object display updating processing). Then at the step S505, the display updating action is recorded as object action record data 306 (object action recording processing), and the operation returns to the step S502, and the abovementioned processing is repeated. If it is determined designation to end at the step S503, the operation proceeds to the step S506, and the photographing ends (video photographing ending processing), and the conference recording processing ends.

FIG. 6 is a diagram showing an example of object action record data 306. As they are denoted by the reference numerals 601 to 607 in FIG. 6, in the object action record data 306, information for identifying an appliance, an object in an appliance, a time an object acted, a type of action, a display region (X1, Y1, X2, Y2) is recorded.

For example, that a still image 1a is displayed in a display region ((20, 50), (450, 100)) of the display device 301 at a time (May 9, 2005 10:35:12) is recorded as object action record data 601. Then, that the still image la is made non-displayed is recorded as object action record data 604.

Figure 7:
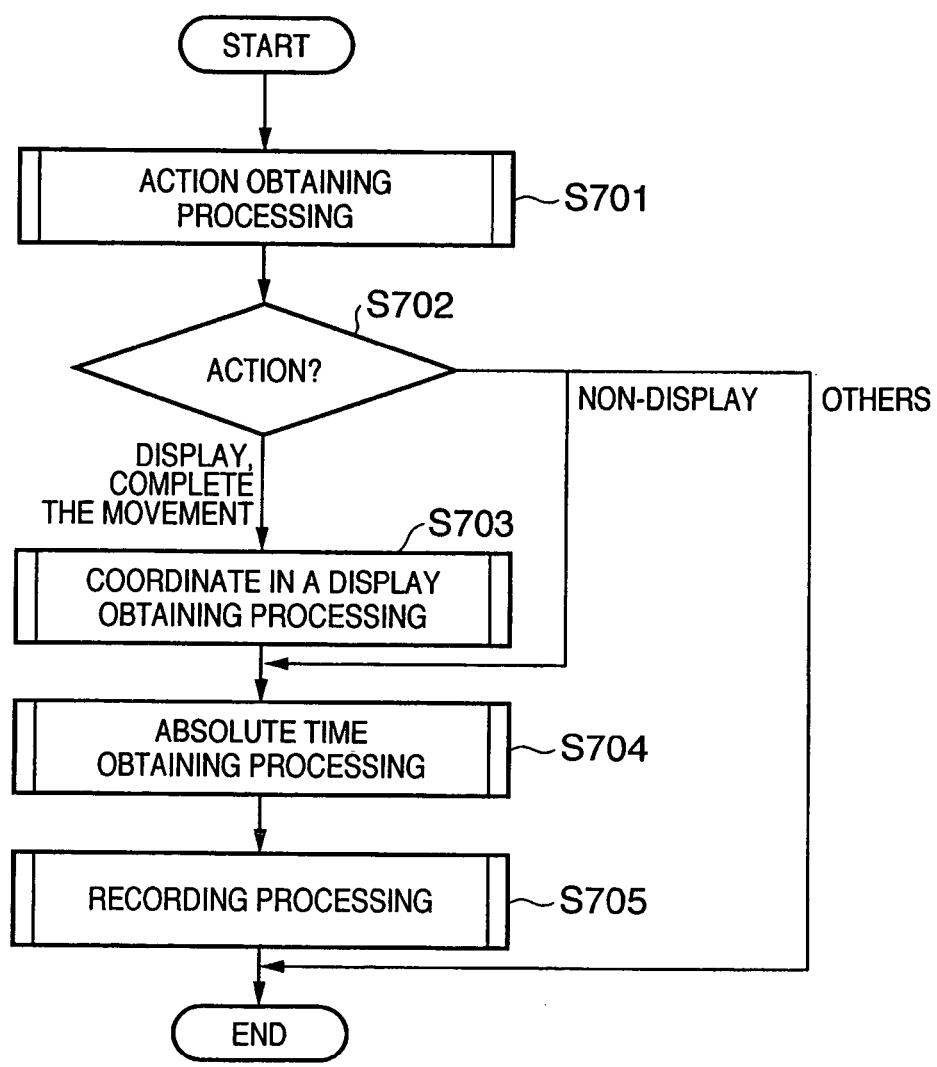
FIG. 7 is a flowchart showing an object action record processing in the first embodiment.

FIG. 7 is a flowchart showing object action record processing in the first embodiment. First at the step S701, an action type of an object is obtained from the object action record data 306 (action obtaining processing). Then at the step S702, an action type is determined, and if the action type is "display" or "complete the movement", the operation proceeds to the step S703, and a display region of the object in the display is obtained (coordinate in a display obtaining processing).

If the action type is "non-display" at the step S702, the operation proceeds to the step S704, and an absolute time of the system is obtained from an operation time on each display device (absolute time obtaining processing). Then at the step S705, information obtained in the processing is recorded as object action record data 306 (recording processing), and the processing ends. On the other hand, if the action type is other than those mentioned above at the step S702, the processing after the step S703 is not executed and the processing ends.

Figure 8:
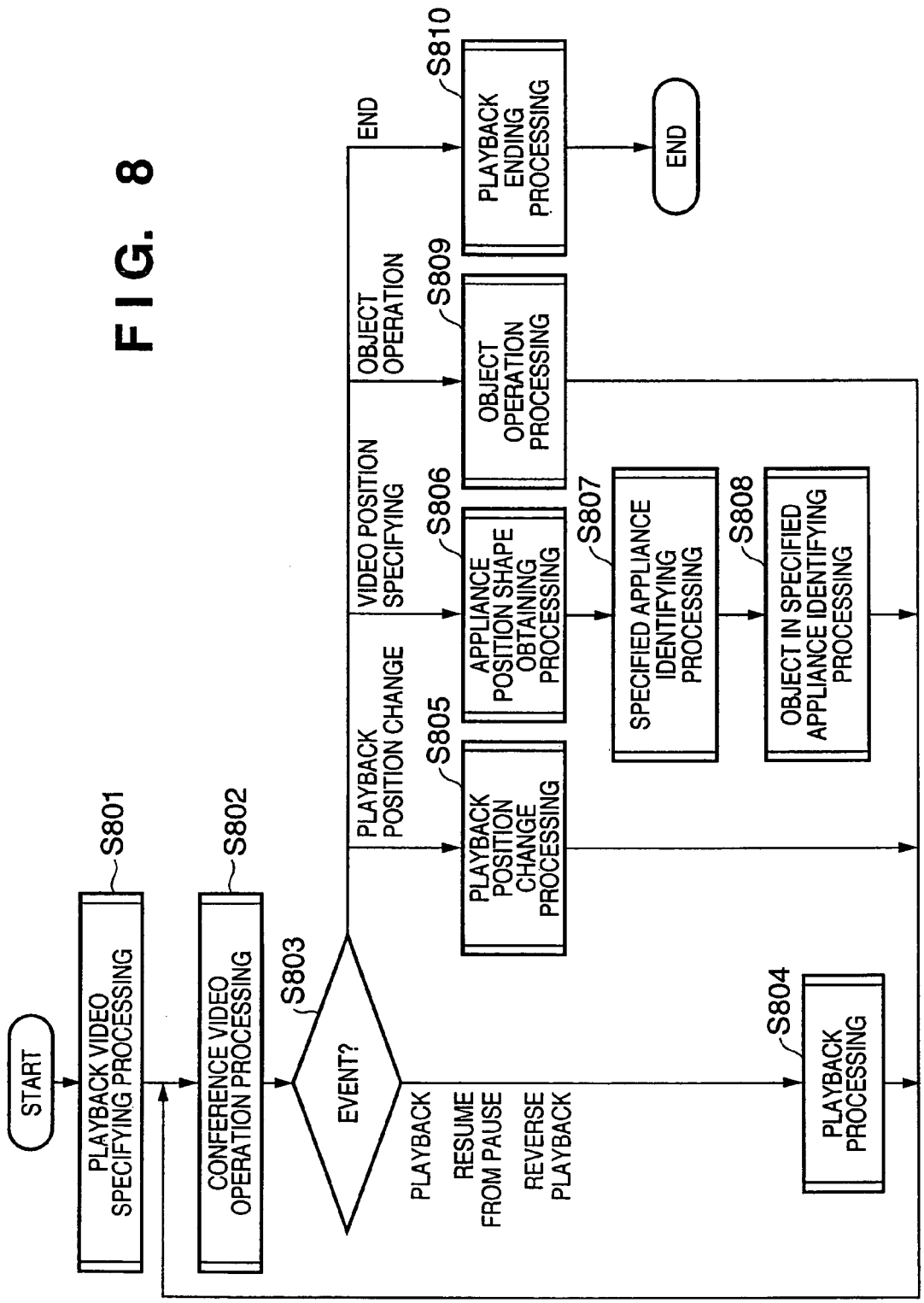
FIG. 8 is a flowchart showing a conference record playback processing in the first embodiment.

FIG. 8 is a flowchart showing conference record playback processing in the first embodiment. First, when a conference record to be processed is specified to the conference record playback 410 at the step S801 (playback video specifying processing), the operation is waited to be done at the following step S802 (conference video operation processing). If the operation is executed and the operation is any designation of "playback", "resume from pause", and "reverse playback" designation at the step S803, the operation proceeds to the step S804. At the step S804, playback or reverse playback from the specified position is executed (playback processing), and the operation returns to the step S802 and the abovementioned processing is repeated.

If the operation is "playback position change" designation at the step S803, the operation proceeds to the step S805, and the playback position is changed to the specified position (playback position change processing), and the operation returns to the step S802 and the abovementioned processing is repeated.

If the operation is "video position specifying" designation at the step S803, the operation proceeds to the step S806, and appliance position shape data at a time corresponding to the playback position is obtained (appliance position shape obtaining processing). Then at the step S807, an appliance corresponding to the specified position is identified (specified appliance identifying processing). Next at the step S808, the object action record data 306 is referenced and an object in an appliance corresponding to the specified position is identified (object in specified appliance identifying processing) Then the operation returns to the step S802 ante the abovementioned processing is repeated.

If the operation is "object operation" designation at the step S803, the operation proceeds to the step S809, and specified operation for an identified object in the abovementioned procedure is executed (object operation processing). Then the operation returns to the step S802, and the abovementioned processing is repeated. If the operation is "end" at the step S803, the operation proceeds to the step S810, the playback ends (playback ending processing) and the processing ends.

Figure 9:
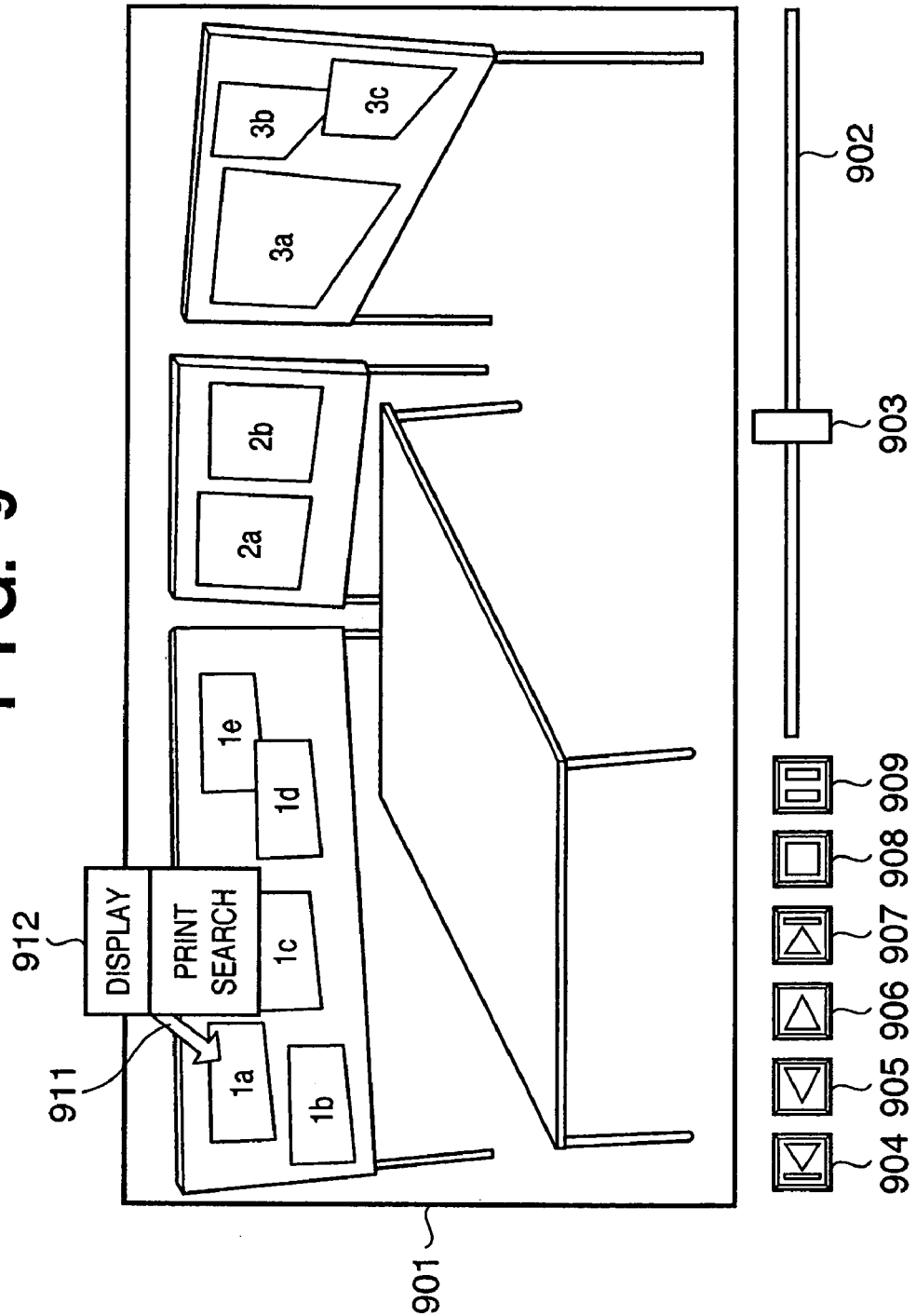
FIG. 9 is a diagram showing an example of a conference video operating screen in which playback operation of a conference video and operation of an object displayed at a specified position in an playback video can be performed.

FIG. 9 is a diagram showing an example of a conference video operating screen in which playback operation of a conference video can be done and an object displayed at the specified position in a playback video can be operated. In the example, a playback position is indicated as a position 903 on a scroll bar 902 and a video 901 at a corresponding time is displayed. Designation buttons including move to the top 904, reverse playback 905, playback 906, move to the end 907, stop 908, and pause 909 on the playback video are shown.

On the other hand, operation for an object of the playback video is executed as an arbitrary position in the playback video 901 is specified 911 at first, and object operation menu 912 corresponding to the specified position is displayed.

Figure 10:
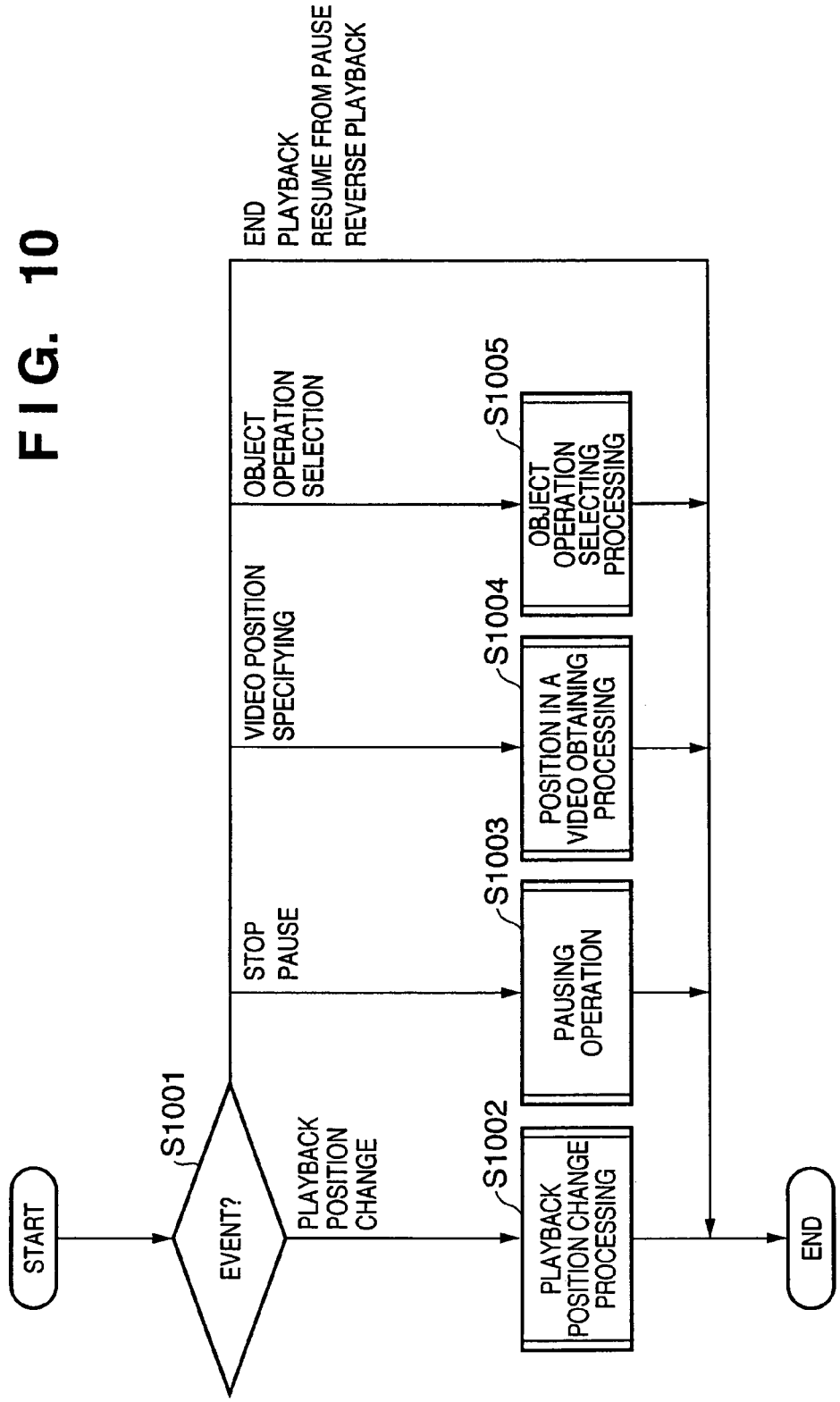
FIG. 10 is a flowchart showing conference video operation processing in the first embodiment.

FIG. 10 is a flowchart showing conference video operation processing in the first embodiment. First at the step S1001, executed operation is determined. As a result, if the executed operation is designation involving "playback position change" including a change of the position 903 on the scroll bar 902, move to the top 904 and move to the end 907, the operation proceeds to the step S1002 and the playback position is changed (playback position change processing), and the processing ends.

If the operation executed at the step S1001 is a designation involving "stop" and "pause" including the stop 908 and the pause 909, the operation proceeds to the step S1003 and the playback stops (stop processing) and the processing ends. If the operation executed at the step S1001 is "video position specification" operation by designation 911 or the like of any position in a playback video 901, the operation proceeds to the step S1004 and the specified position information is obtained (position in a video obtaining processing) and the processing ends.

If the operation executed at the step S1001 is "object operation selection" designation, the operation proceeds to the step S1005 and the specifying operation is selected (object operation selecting processing) and the processing ends. Further, if it is operation other than those mentioned above at the step S1001, the abovementioned processing is not executed and the processing ends.

FIG. 11 is a diagram showing an example of an appliance position shape data 308. Like the reference numerals 1101 to 1105 shown in FIG. 11, in the appliance position shape data 308, information for identifying an appliance, an acting time to the appliance, a type of action, a physical size indicating the actual size of an appliance, a position shape on a video (upper left, lower left, upper right, lower right) is recorded.

For example, those shown below are recorded as appliance position shape data 1101.

A display device 302 with a physical size (640, 480) and a position shape ((115, 8), (115, 42), (160, 8), (160, 42)) on a video is set up at the time (Jan. 1, 2005 00:00:00).

Further, that the display device 301 is removed is recorded as appliance position shape data 1104.

Figure 12:
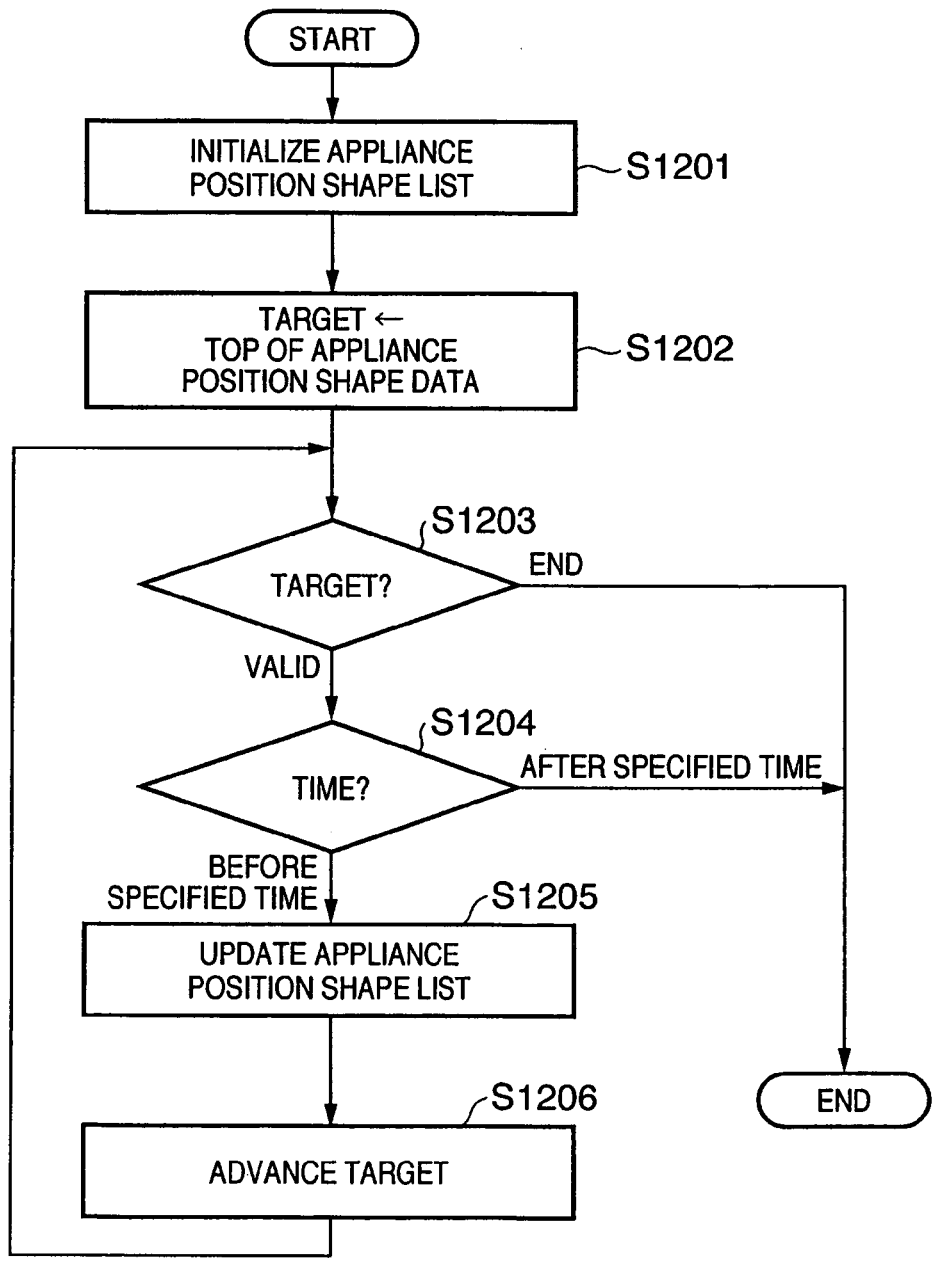
FIG. 12 is a flowchart showing appliance position shape obtaining processing for obtaining appliance position shape data at a time corresponding to a playback position in the first embodiment.

FIG. 12 is a flowchart showing appliance position shape obtaining processing for obtaining appliance position shape data at a time corresponding to the playback position in the first embodiment. First at the step S1201, an appliance position shape list is initialized, and at the following step S1202, a target is initialized to the top of appliance position shape data. Then at the step S1203, whether the target is valid or not is determined, and if it is valid, the operation proceeds to the step S1204, and whether the time indicated by appliance position shape data 308 of the target is before the time corresponding to the specified playback position or not is determined. As a result, if it is determined as before the specified time, the operation proceeds to the step S1205 and the appliance position shape list is updated, and the target is advanced at the step S1206, and the operation returns to the step S1203 and the abovementioned processing is repeated.

On the other hand, if the target is not valid, i.e., if it is end at the step S1203, or if it is determined that the time indicated by the appliance position shape data of the target as after the time corresponding to the specified playback position at the step S1204, the processing ends.

Figure 13:
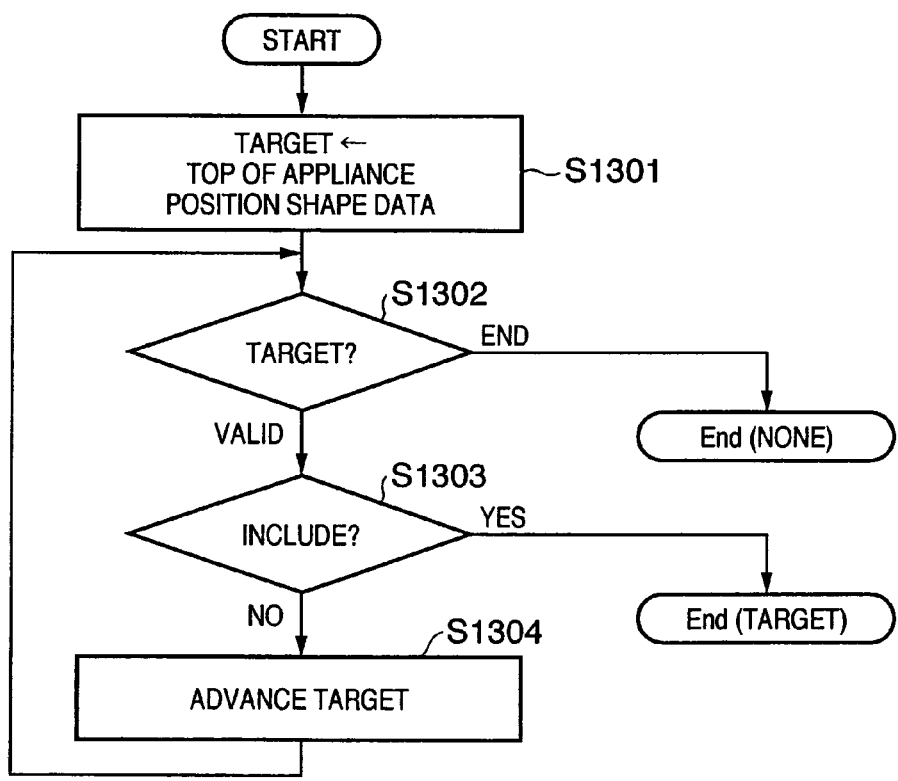
FIG. 13 is a flowchart showing specified appliance identifying processing in the first embodiment.

FIG. 13 is a flowchart showing specified appliance identifying processing in the first embodiment. First at the step S1301, the target is initialized to the top of the appliance position shape data, and the processing after the step S1302 is repeated. Whether the target is valid or not is determined at the step S1302, and if it is valid, the operation proceeds to the step S1303 and whether a specified position is included in a display region shown by the position shape on a video in the appliance position shape data 308 of the target or not is determined. As a result, if the specified position is included in the display region, the processing ends with the appliance position shape data 308 of the target being a returned value.

If the specified position is not included in the display region at the step S1303, the operation proceeds to the step S1304 and the target is advanced and the operation returns to the step S1302 and the abovementioned processing is repeated. On the other hand, if the target is not valid, i.e., if no appliance corresponding to the specified position is present at the step S1302, the processing ends.

Figure 14:
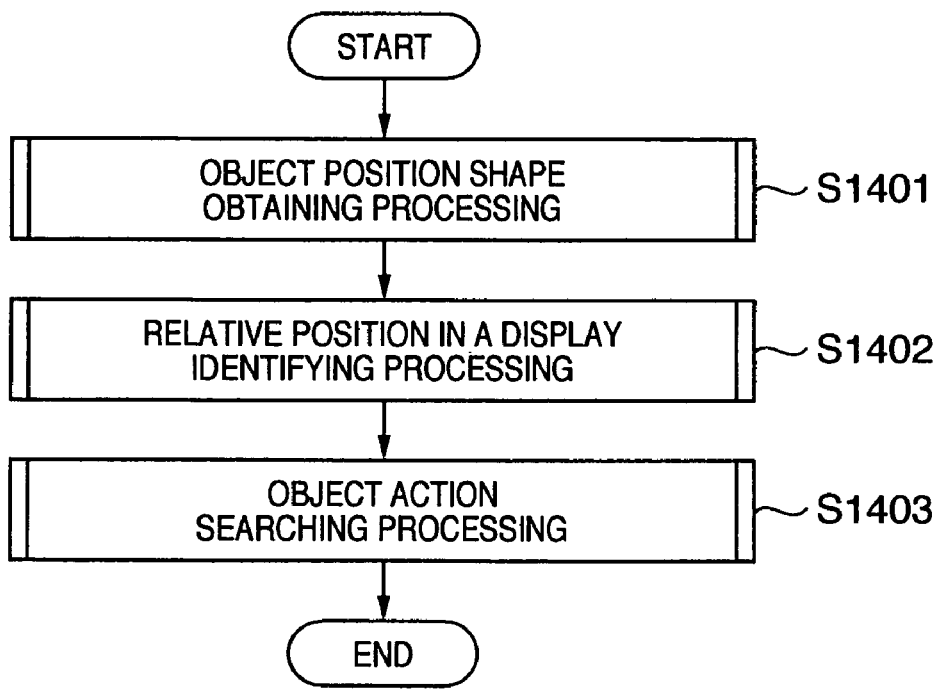
FIG. 14 is a flowchart showing an object in a specified appliance identifying processing in the first embodiment.

FIG. 14 is a flowchart showing object in specified appliance identifying processing in the first embodiment. First at the step S1401, appliance position shape data at a time corresponding to a playback position is obtained (object position shape obtaining processing). Next at the step S1402, a relative position in a display device in consideration of distortion on a video of a specified appliance is obtained (relative position in a display identifying processing). Then at the step S1403, object action record data corresponding to the specified position is searched for (object action searching processing) and the processing ends.

Figure 15:
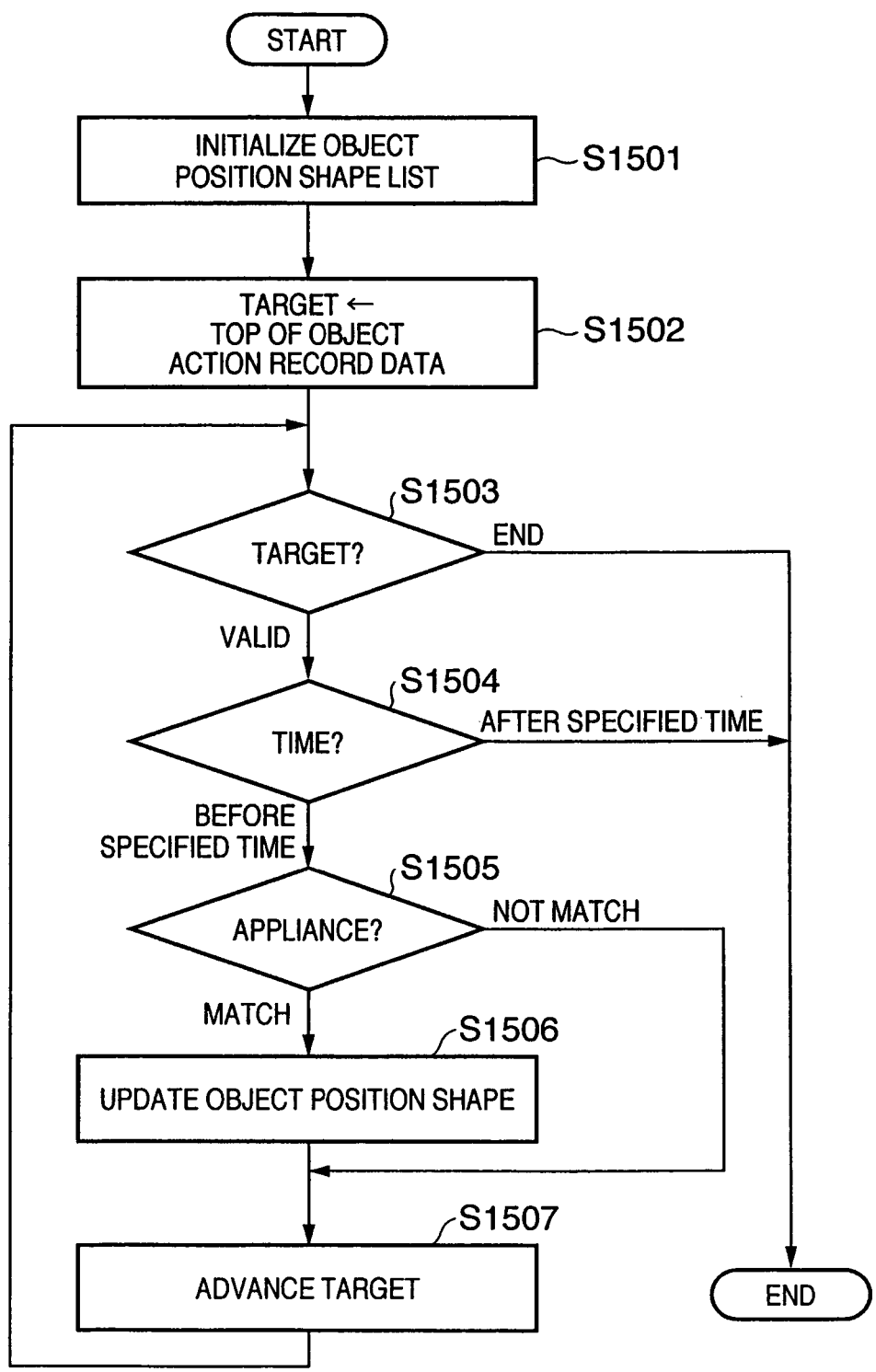
FIG. 15 is a flowchart showing object position shape obtaining processing shown in FIG. 14.

FIG. 15 is a flowchart showing object position shape obtaining processing shown in FIG. 14. First at the step S1501, an object position shape list to be a returned value is initialized, and at the following step S1502, the target is initialized with the top of the object action record data. Then, the processing after the step S1503 is repeated.

If the target is valid at the step S1503, the operation proceeds to the step S1504 and, whether a time indicated by the object action record data of the target is before the specified time or not is determined. If it is determined as before the specified time, the operation proceeds to the step S1505, and whether it matches with the specified appliance or not is determined. As a result, if it is determined that it matches with the specified appliance, the operation proceeds to the step S1506 and the object position shape data in the object position shape list is updated. Then after the target is advanced at the step S1507, the operation returns to the step S1503 and the abovementioned processing is repeated.

On the other hand, if it is determined that the target ends at the step S1503, or if the time indicated by the object action record data of the target is determined as after the specified time at the step S1504, the object position shape list set till then is made returned values and the processing ends.

Figure 16:
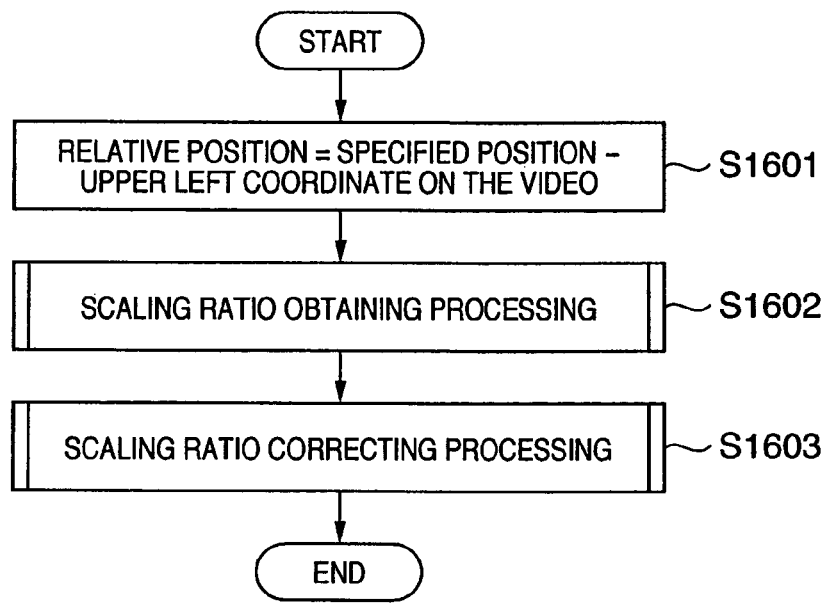
FIG. 16 is a flowchart showing a relative position in a display identifying processing shown in FIG. 14.

FIG. 16 is a flowchart showing relative position in a display identifying processing shown in FIG. 14. First at the step S1601, a relative position is set as the upper left coordinate of a specified appliance on the video being a starting point, and at the following step S1602, a scaling ratio of the specified appliance on the video is obtained (scaling ratio obtaining processing). Then at the step S1603, a relative position in a display device against the specified position is corrected by using the scaling ratio and the processing ends.

Figure 17:
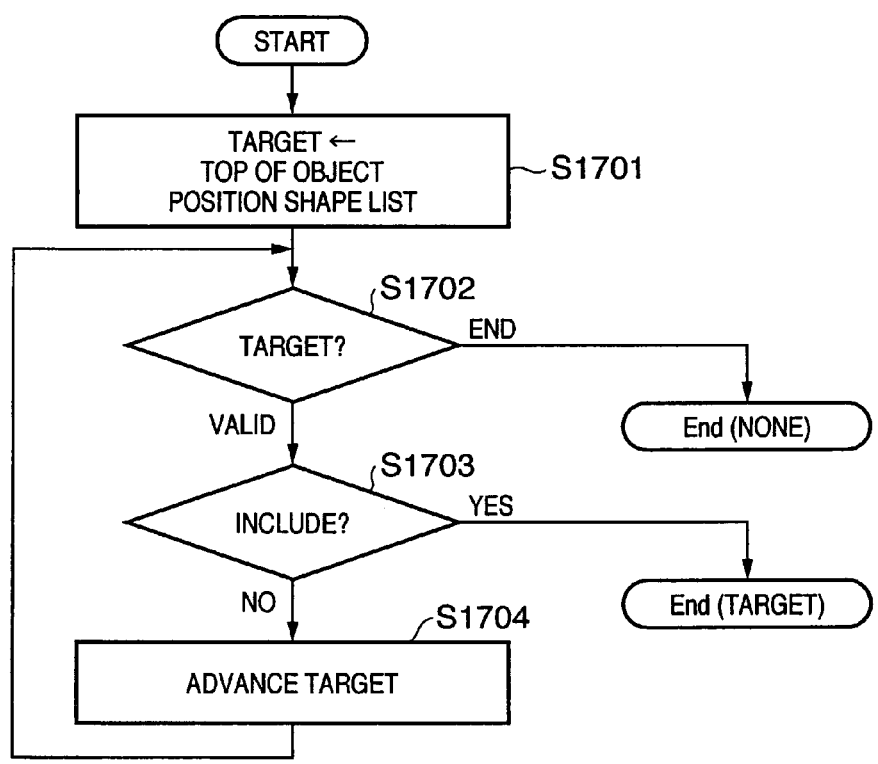
FIG. 17 is a flowchart showing object action searching processing in the first embodiment.

FIG. 17 is a flowchart showing object action searching processing in the first embodiment. First at the step S1701, the target is initialized with the top of the object position shape list, and the processing at the following step S1702 and after that step is repeated.

Whether the target is valid or not is determined at the step S1702, and if it is valid, the operation proceeds to the step S1703, and whether the relative position in a display device indicated by the specified position is included in the display region of the object position shape data of the target or not is determined. As a result, if it is included in the display region, the processing ends with the object action record data of the target being a returned value.

If it is not included in the display region at the step S1703, the operation proceeds to the step S1704 and the target is advanced, and the operation returns to the step S1702 and the abovementioned processing ends. On the other hand, if the target is not valid at the step S1702, it is considered that the searching fails and the processing ends.

Figure 18:
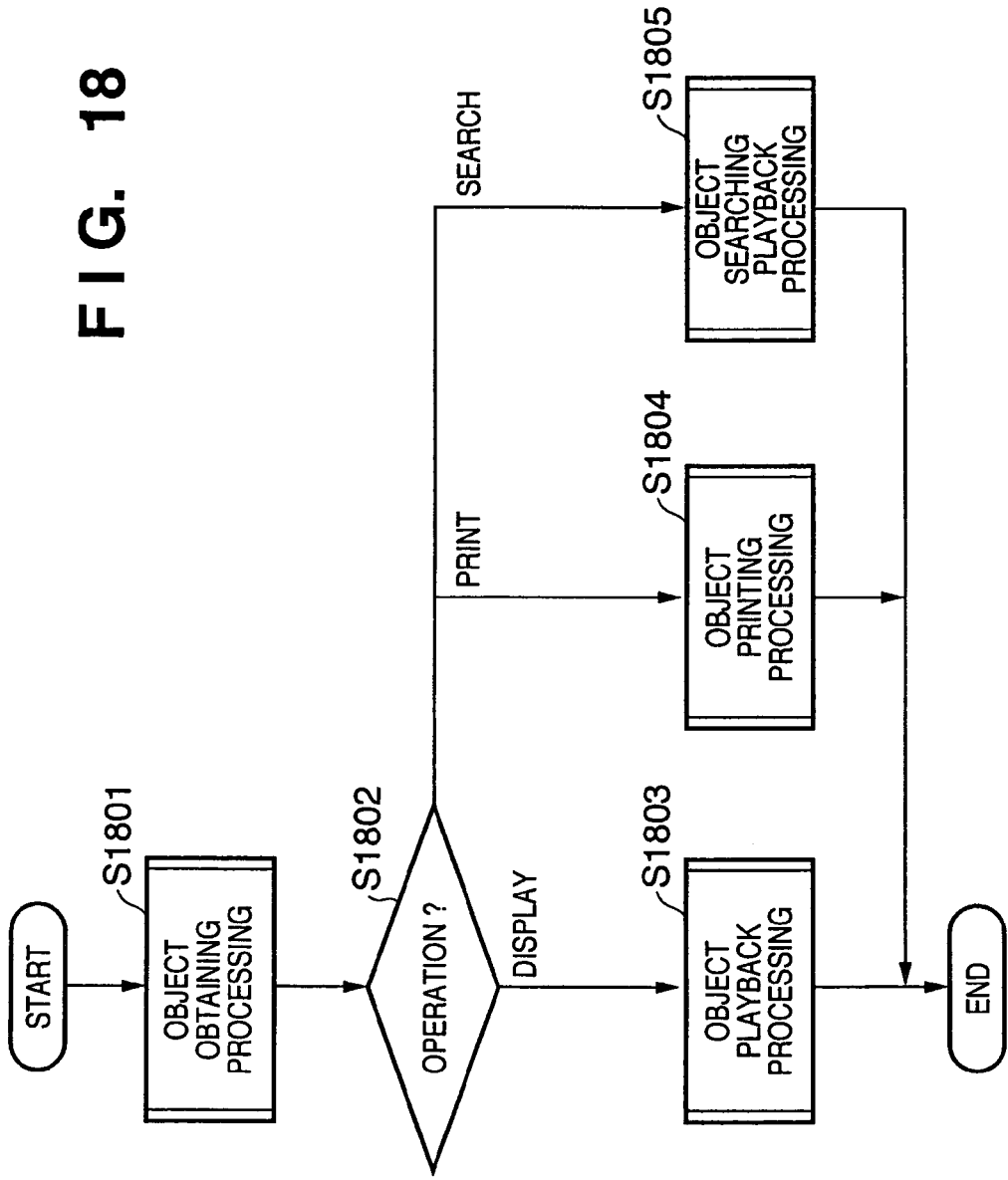
FIG. 18 is a flowchart showing object operation processing in the first embodiment.

FIG. 18 is a flowchart showing object operation processing in the first embodiment. First at the step S1801, an object corresponding to the specified position identified by the abovementioned processing is obtained (object obtaining processing), and it is branched at the step S1802. If the specified operation is display designation, the operation proceeds to the step S1803 and playback processing of the identified object is executed (object playback processing) and the processing ends.

If specified operation is printing designation at the step S1802, the operation proceeds to the step S1804, and printing processing of the identified object is executed (object printing processing) and the processing ends. If the specified operation is searching designation, the operation proceeds to the step S1805 and timing for the identified object to change is searched for, the video from the position is played back (object searching playback processing) and the processing ends.

As such, according to the first embodiment, an appliance and an object in the appliance can be identified from the playback video. Operation such as enlarged display or printing on the identified object can also be possible. Particularly, a display object on a display can be identified.

Second Embodiment

Next, by using FIG. 19 to FIG. 23, a second embodiment according to the present invention will be described in detail. The second embodiment is described by taking an example of a case where particularly a target appliance is a printer and an appliance and an object in the appliance corresponding to a position in a time and a position in a space designated in the playback video are identified and operation such as enlarged display or printing is executed.

Figure 19:
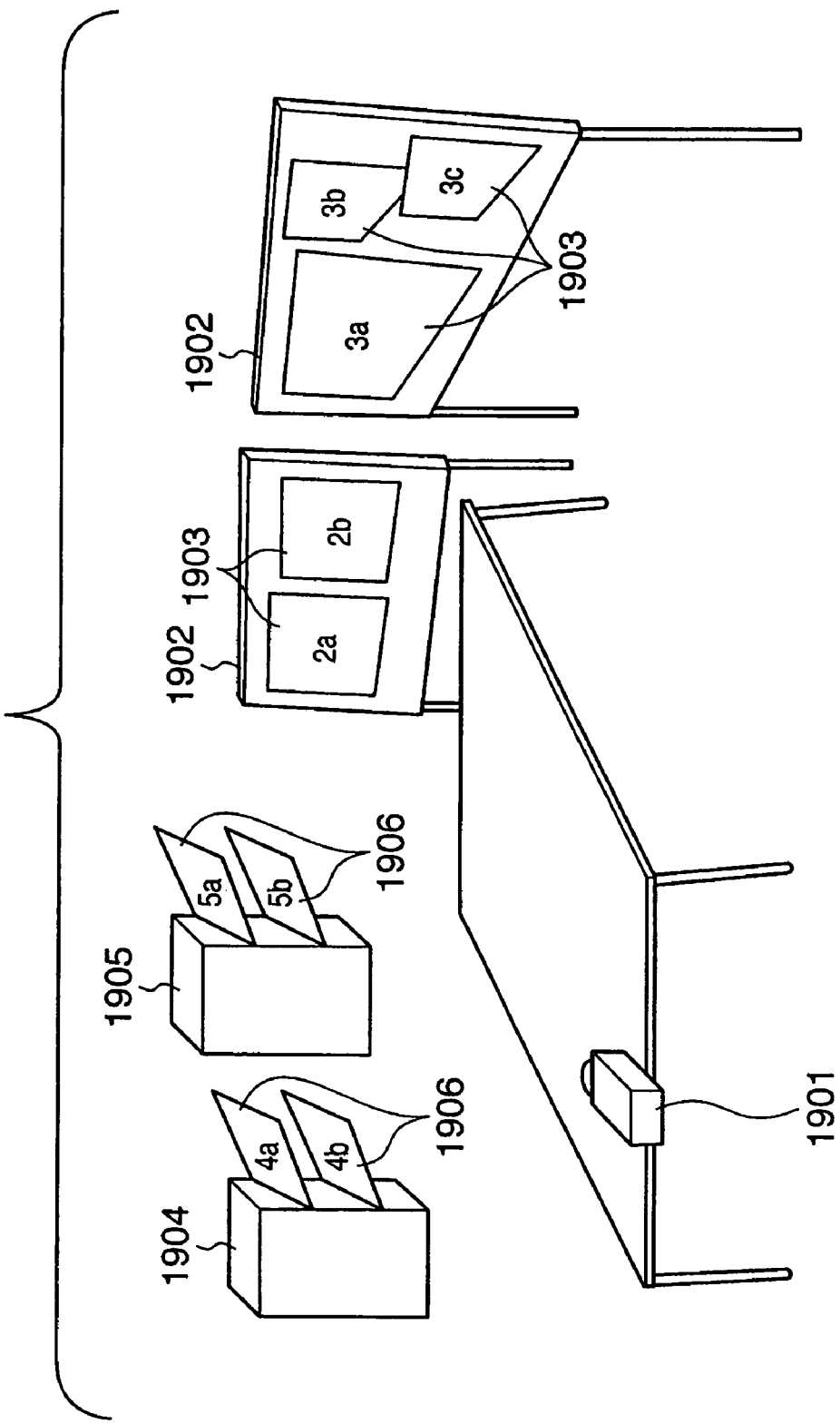
FIG. 19 is a diagram showing an example of a system video including a printer in a second embodiment.

FIG. 19 is a diagram showing an example of a system video including a printer in the second embodiment. The system shown in FIG. 19 visualizes a conference room consisting of two displays 1902 with large screens, two printers 1904, 1905, and a camera 1901 which photographs a conference with a wide angle as well as a conference desk in a usual conference room. It is shown that a plurality of display objects 1903 are displayed on each display screen, and a plurality of print objects 1906 are positioned on an output tray of each printer.

FIG. 20 is a diagram showing an example of object action record data which targets a printer. Like the reference numerals 2001 to 2005 shown in FIG. 20, information for identifying an appliance and an object in the appliance, a time an object acted, a type of action, a print tray are recorded in the object action record data.

For example, that a still image 4a is printed on a print tray "a" at a time May 9, 2005 10:37:22 by the printing device 1904 is recorded. That the object is received is also recorded as object action record data 2004.

Figure 21:
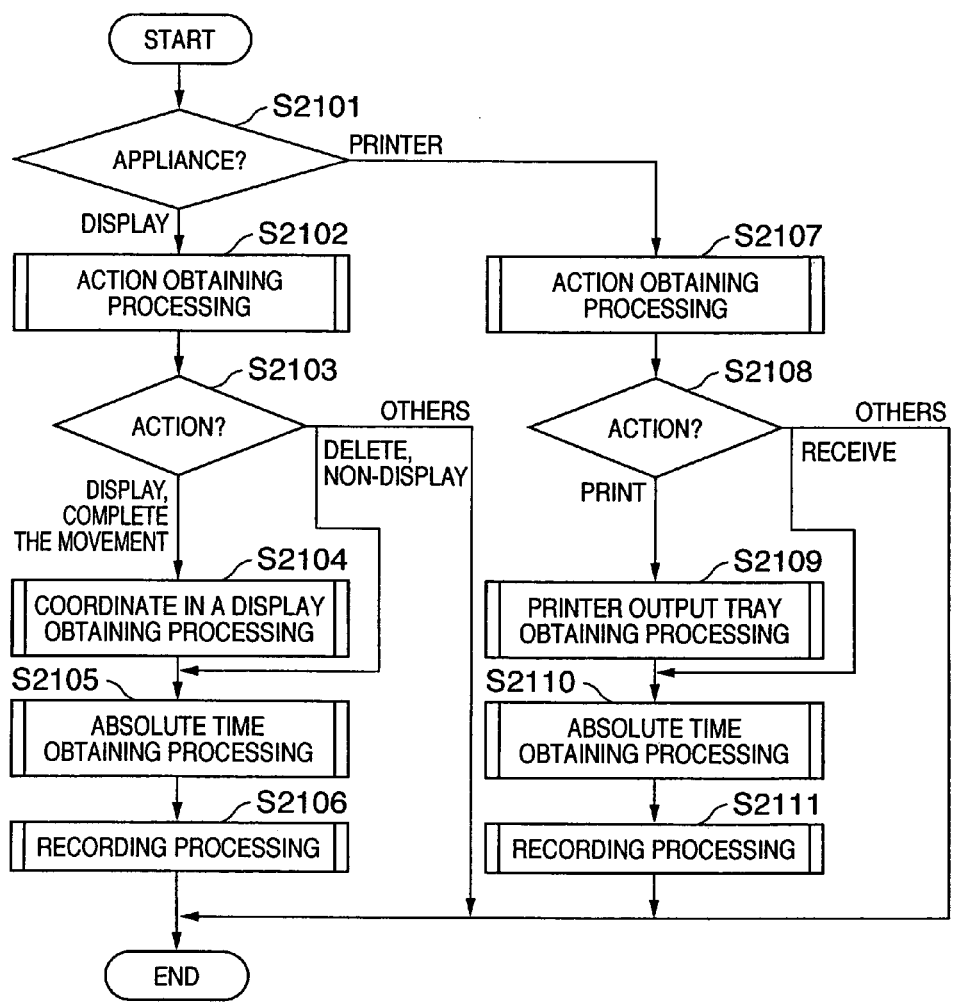
FIG. 21 is a flowchart showing object action record processing in the second embodiment.

FIG. 21 is a flowchart showing object action recording processing in the second embodiment. First at the step S2101, a recorded target appliance is determined and if it is a display, the operation proceeds to the step S2102, and an action type of the object is obtained from the object action record data (action obtaining processing). Then at the step S2103, the action type is determined, and if the action type is "display" or "complete the movement", the operation proceeds to the step S2104, and a display region of the object in the display is obtained (coordinate in a display obtaining processing).

If the action type is "delete" or "non-display" at the step S2103, the operation proceeds to the step S2105 and an absolute time is obtained from operation times on respective display devices (absolute time obtaining processing). Next at the step S2106, information obtained in the processing is recorded as object action record data (recording processing), and the processing ends. If the action type is other than those mentioned above at the step S2103, the processing ends.

If the recording target appliance is a printer at the step S2101, the operation proceeds to the step S2107, and the action type of the object is obtained from object action record data (action obtaining processing). Then at the step S2108, the action type is determined, and if the action type is "print, the operation proceeds to the step S2109 and an output tray of the object is obtained (printer output tray obtaining processing).

If the action type is "receive" at the step S2108, the operation proceeds to the step S2110 and an absolute time of the system is obtained from operation times on respective printing devices (absolute time obtaining processing). Next at the step S2111, information obtained by the processing is recorded as object action record data (recording processing) and the processing ends. If the action type is other than those mentioned above at the step S2108, the processing ends.

FIG. 22 is a diagram showing an example of appliance position shape data of a printer. As the reference numerals 2201 to 2206 shown in FIG. 22, in the appliance position shape data, information for identifying an appliance, an output tray, a time of action against an appliance, type of action, and a position shape on a video (upper left, lower left, upper right, lower right) are recorded.

For example, that an output tray "b" of a printing device 1404 is setup at a time of Feb. 1, 2005 00:00:00 is recorded as appliance position shape data 2204. That the output tray "b" is removed is also recorded as appliance position shape data 2205.

Figure 23:
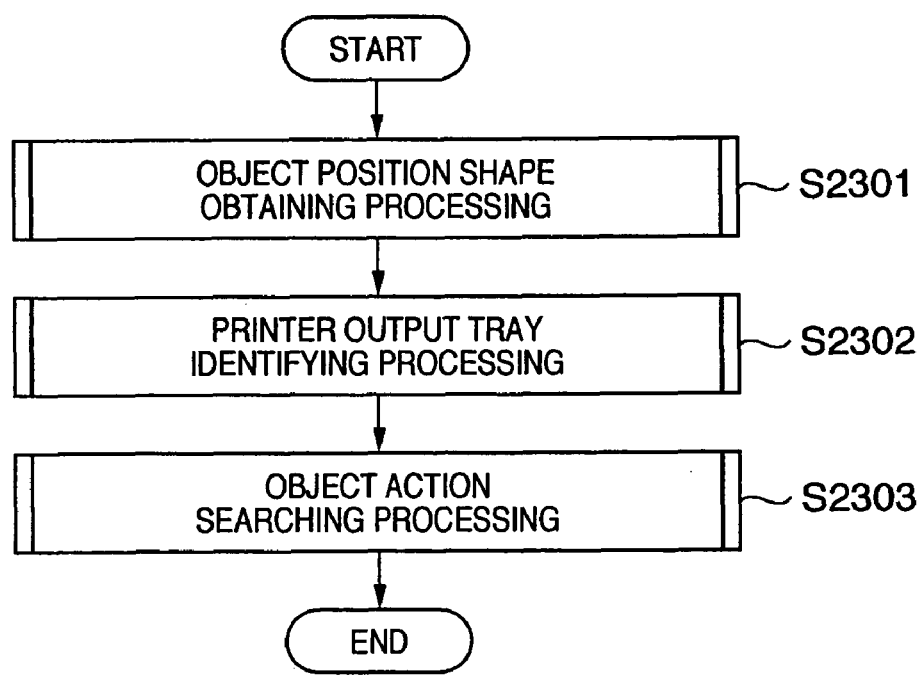
FIG. 23 is a flowchart showing an object in a specified appliance identifying processing in the second embodiment.

FIG. 23 is a flowchart showing object in a specified appliance identifying processing in the second embodiment. First at the step S2301, appliance position shape data at a time corresponding to a playback position is obtained (object position shape obtaining processing). Next at the step S2302, an output tray corresponding to a specified position is obtained from the appliance position shape data (printer output tray identifying processing). Then at the step S2303, object action record data corresponding to the specified position is searched for (object action searching processing) and the processing ends.

In such a manner, according to the second embodiment, particularly a print object on a printer output tray can be identified.

Third Embodiment

Next, by using FIG. 24 to FIG. 25, a third embodiment according to the present invention will be described in detail. The third embodiment will be described by taking an example of a case where a user specifies a position shape of an appliance displayed in a playback video.

Figure 24:
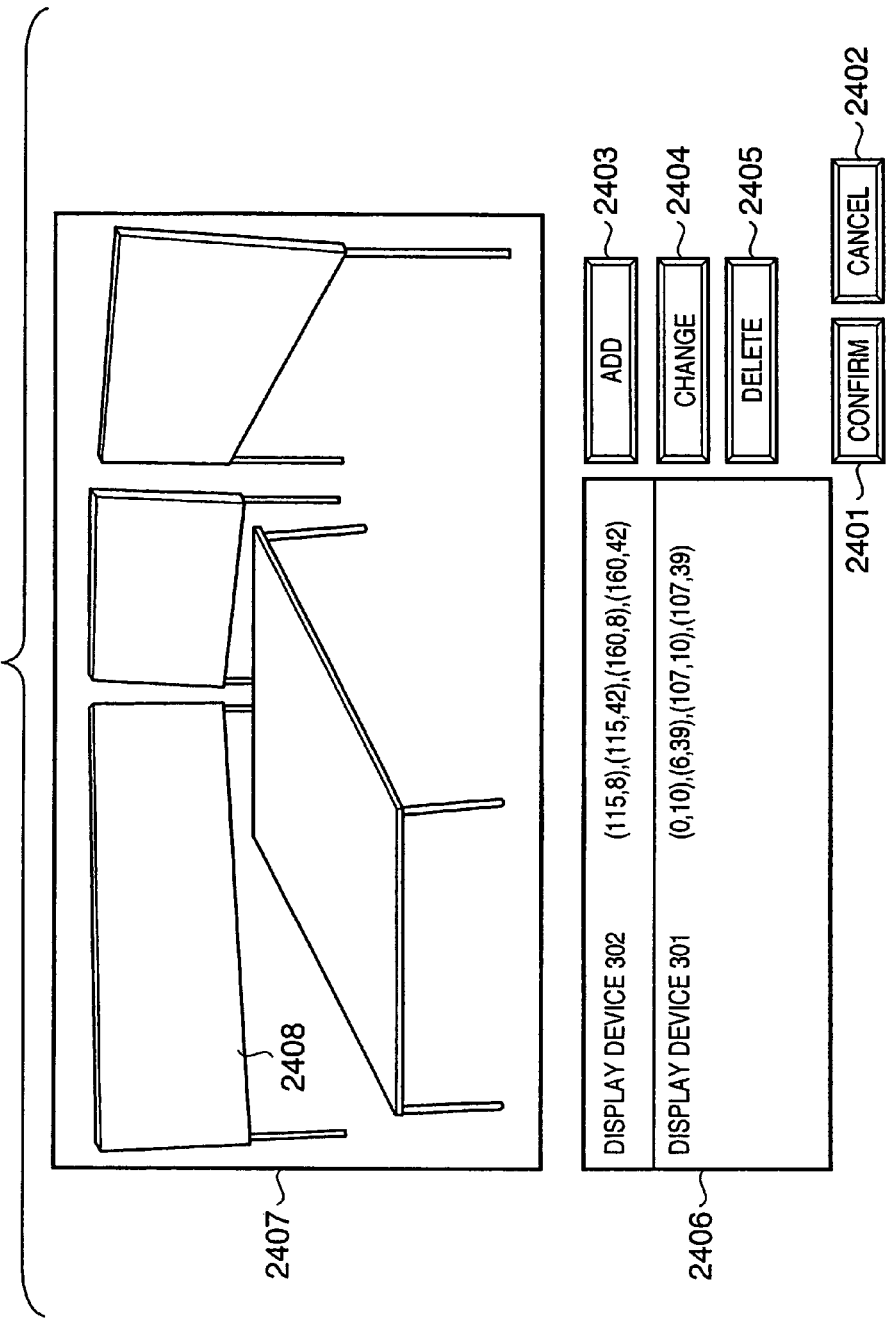
FIG. 24 is a diagram showing an example of an appliance position shape designating screen which can designate a display region of an appliance which is displayed on a conference video.

FIG. 24 is a diagram showing an example of an appliance position shape designating screen, in which a display region of an appliance displayed in a conference video can be designated. An arbitrary display region 2408 of a conference video 2407 being played back can be designated as a position shape of an arbitrary appliance 2406 with the appliance position shape designating screen shown in FIG. 24 used.

On the appliance position shape designating screen shown in FIG. 24, a list of appliances to be designated is displayed, with designation buttons of "add 2403", "change 2404", "delete 2405" being positioned against the list and further designation buttons of "confirmation 2401", "cancel 2402" being positioned.

Figure 25:
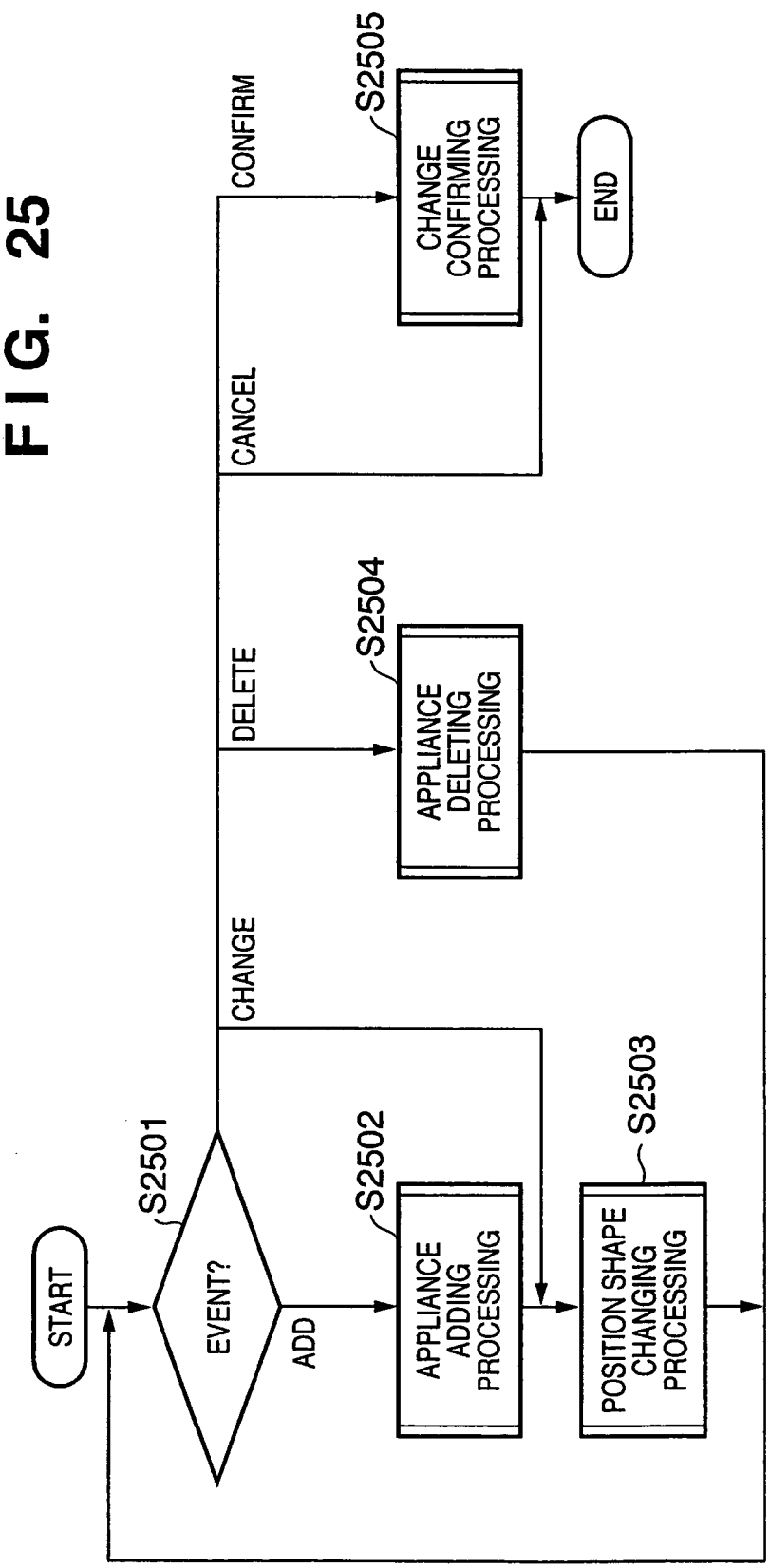
FIG. 25 is a flowchart showing appliance position shape designating processing in a third embodiment.

FIG. 25 is a flowchart showing appliance position shape designating processing in the third embodiment. First at the step S2501, performed operation is determined and if the operation is "add" designation, the operation proceeds to the step S2502, and an appliance forming the system is added (appliance adding processing). Then at the step S2503, a position shape in a playback video against the appliance is designated (position shape changing processing) and the operation returns to the step S2501 and the abovementioned processing ends.

If the operation is "change" designation at the step S2501, the operation proceeds to the step S2503 and position shape changing processing is executed. If the operation is "delete" designation, the operation proceeds to the step S2504, and a selected appliance is deleted (appliance deleting processing), and the operation proceeds to the step S2501 and the processing mentioned above is repeated.

If the operation is "cancel" designation at the step S2501, the processing ends. If the operation is "confirmation" designation, the operation proceeds to the step S2505, and changed details are confirmed (change confirming processing) and the processing ends.

In such a manner, according to the third embodiment, a position and shape of an appliance in a playback video can be explicitly specified.

Fourth Embodiment

Next, by using FIG. 26 to FIG. 28, a fourth embodiment according to the present invention will be described in detail. The fourth embodiment will be described by taking an example of a case where particularly a target appliance is a display, and a position shape of the appliance displayed in a photographed video can be automatically set without requiring a user to specify it as the appliance is prompted to do a particular action.

Figure 26:
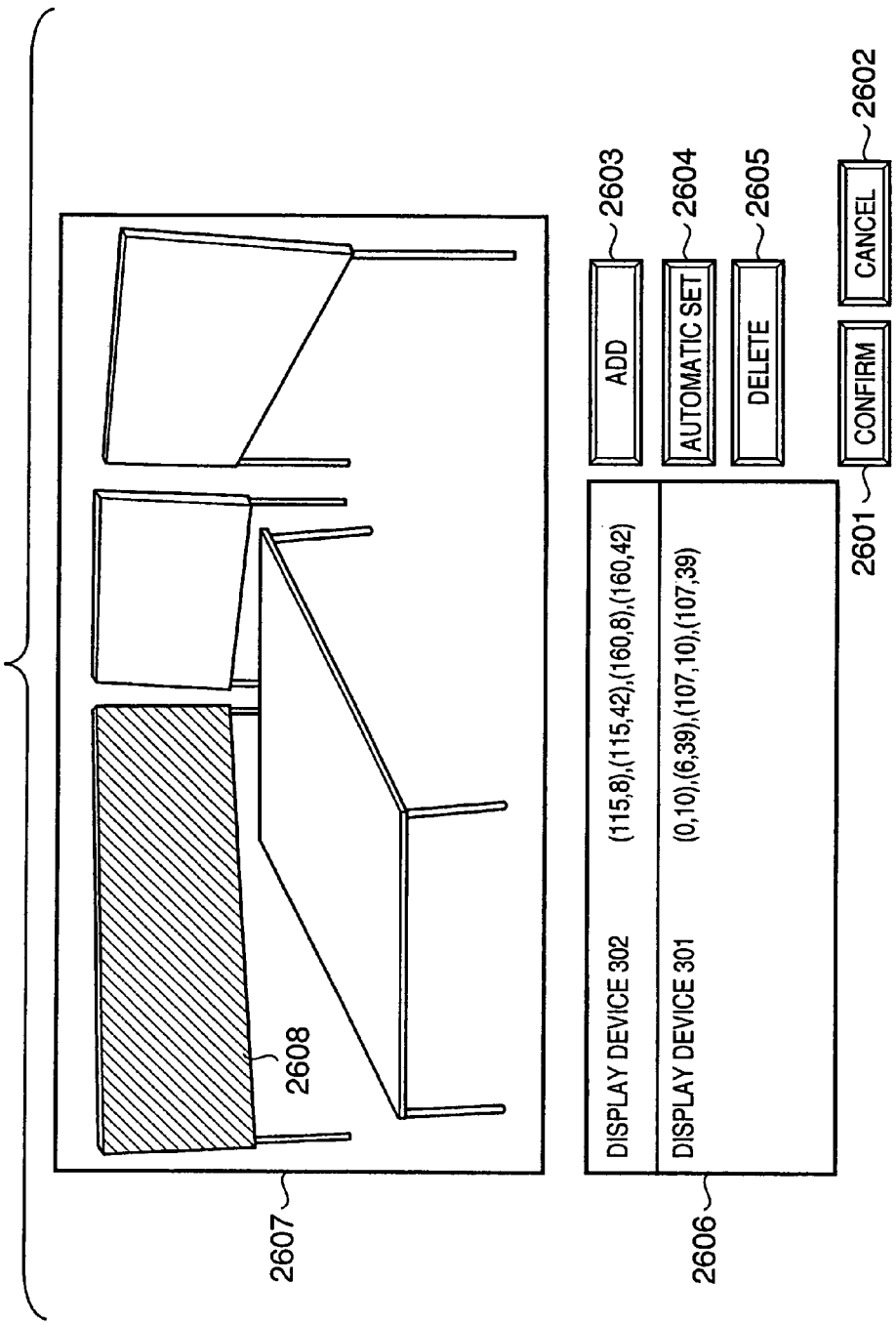
FIG. 26 is a diagram showing an example of an appliance position shape designating screen which can automatically set a display region of an appliance displayed on a photographed video.

FIG. 26 is a diagram showing an example of an appliance position shape designation screen, in which a display region of an appliance displayed in a photographed video can be automatically set. A position shape can be automatically set, as a display region 2608 of an arbitrary appliance 2606 being displayed in a conference video 2607 in a photographed video is prompted a change in a video by an appliance position shape designation screen shown in FIG. 26.

On the appliance position shape designation screen shown in FIG. 26, a list of appliances to be designated is displayed, with designation buttons of "add" 2603, "automatic set" 2604, "delete" 2605 being positioned against the list, and further designation buttons of "confirmation" 2601, "cancel" 2602 being positioned.

Figure 27:
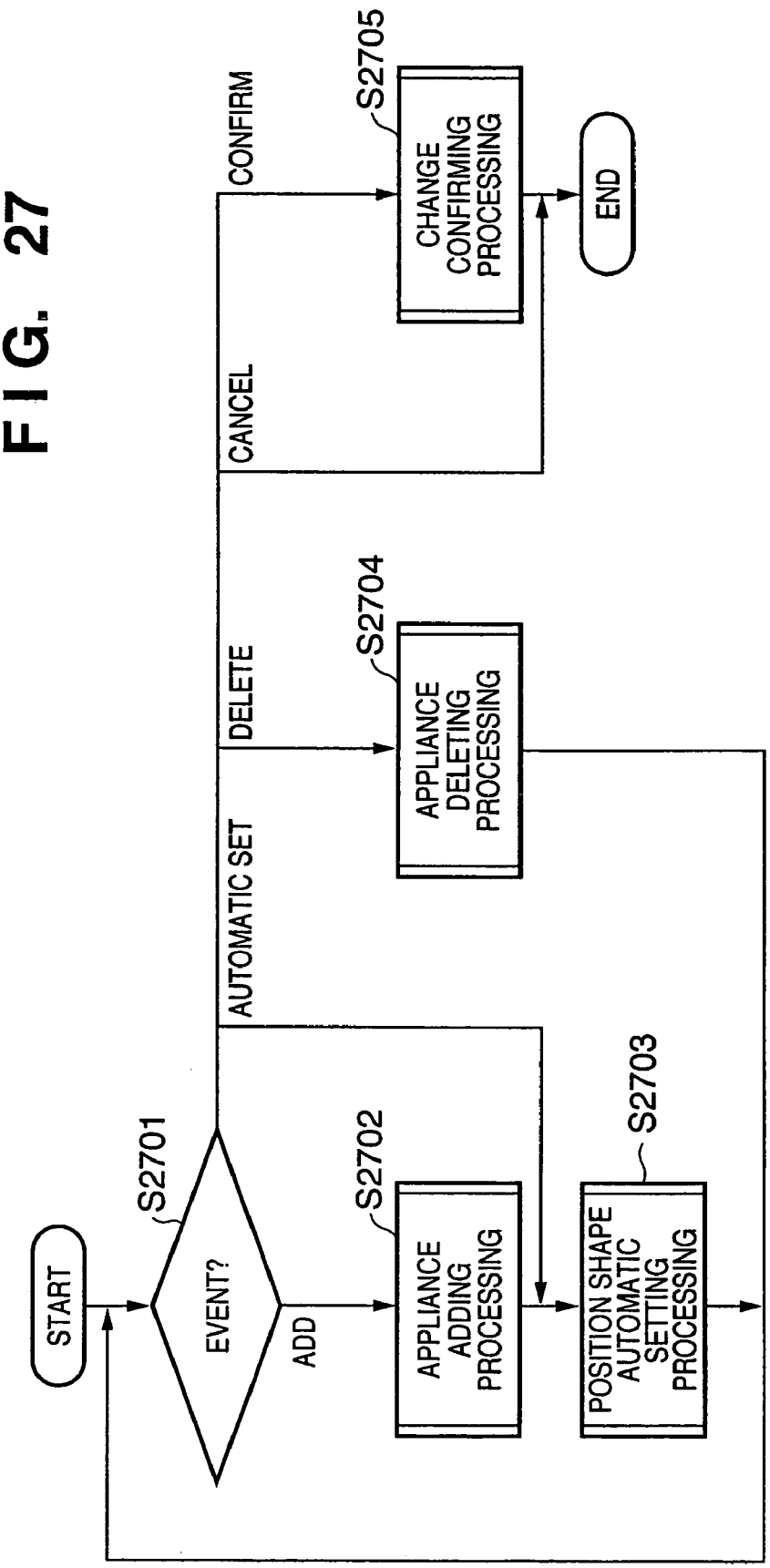
FIG. 27 is a flowchart showing appliance position shape designating processing in a fourth embodiment.

FIG. 27 is a flowchart showing appliance position shape designation processing in the fourth embodiment. First, performed operation is determined at the step S2701, and if the operation is "add" designation, the operation proceeds to the step S2702 and an appliance forming the system is added (appliance adding processing). Then a position shape in a playback video against the appliance is automatically set at the step S2703, (position shape automatic setting processing) and the operation proceeds to the step S2701 and the processing mentioned above is repeated.

If the operation is designation of "automatic setting" at the step S2701, the operation proceeds to the step S2703 and position shape automatic setting processing is executed. If the operation is designation of "delete", the operation proceeds to the step S2704, and a selected appliance is deleted (appliance deleting processing) and the operation returns to the step S2701 and the processing mentioned above is repeated.

If the operation is designation of "delete" at the step S2701, the processing ends. If the operation is designation of "confirmation", the operation proceeds to the step S2705 and changed details till then is confirmed (change confirming processing) and the processing ends.

Figure 28:
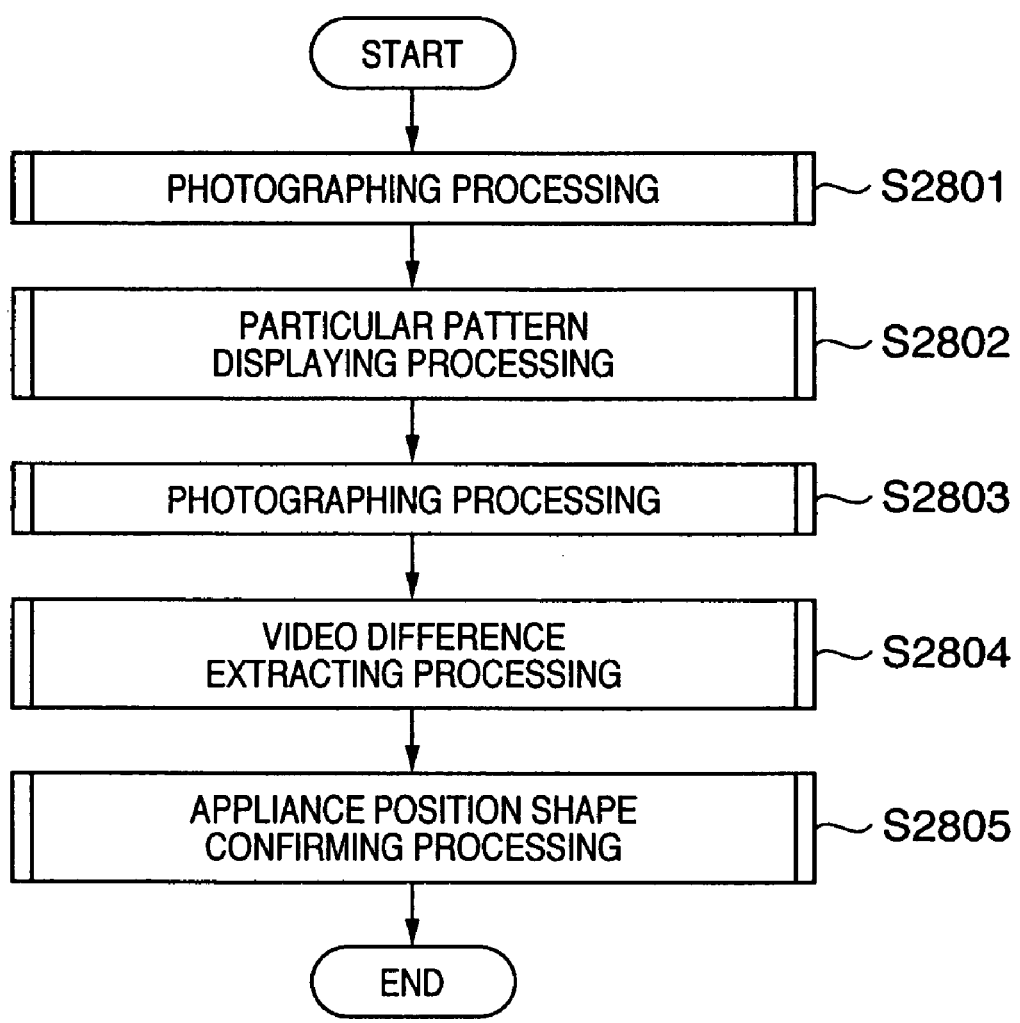
FIG. 28 is a flowchart showing position shape automatic setting processing in the fourth embodiment.

FIG. 28 is a flowchart showing position shape automatic setting processing in the fourth embodiment. First at the step S2801, a video before change of video due to the processing mentioned later appears is photographed (photographing processing). At the step S2802, a video of a particular pattern is displayed on a display to be automatically set (particular pattern displaying processing). As a result, a changed video is photographed (photographing processing) at the step S2803, and a difference between before and after the change is extracted at the step S2804 (video difference extracting processing). At the step S2805, a position shape is estimated and set based on the difference (appliance position shape confirming processing) and the processing ends.

In such a manner, according to the fourth embodiment, a position and shape of an appliance in a playback video can be estimated without requiring the position and shape of the appliance in the playback video is specified. Particularly, a position and shape of a display in a playback video can be estimated.

Fifth Embodiment

Next, by using FIG. 29 to FIG. 30, a fifth embodiment according to the present invention will be described in detail. The fifth embodiment is described by taking an example of a case where particularly a target appliance is a printer, and a position shape of an appliance displayed in the photographed video can be automatically set without requiring a user to specify it, as the appliance is prompted to do a particular action.

Figure 29:
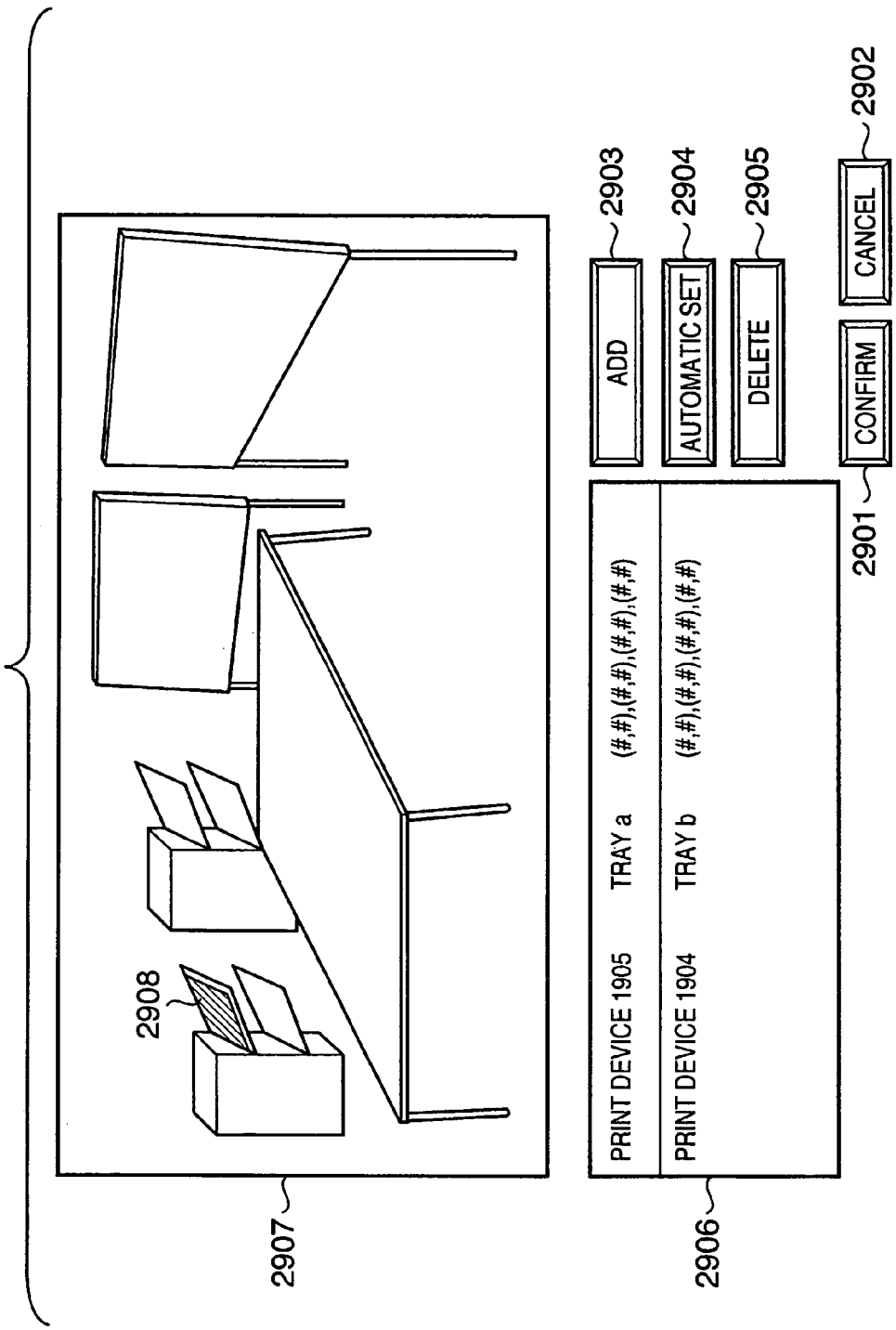
FIG. 29 is a diagram showing an example of an appliance position shape designating screen which can automatically set a display region of a printer displayed on a photographed video.

FIG. 29 is a diagram showing an example of appliance position shape designating screen, in which a display region of a printer displayed in a photographed video can be automatically set. A position shape can be automatically set, as the appliance position shape designating screen shown in FIG. 29 prompts an output tray display region 2908 of a print device 2906 being displayed in a conference video 2907 of a video being photographed to change a video.

On an appliance position shape designation screen shown in FIG. 29, a list of appliances to be designated is displayed, with designation buttons of "add 2903", "automatic setting 2904", "delete 2905" being placed and further designation buttons of "confirmation 2901", "cancel 2902" being placed.

Figure 30:
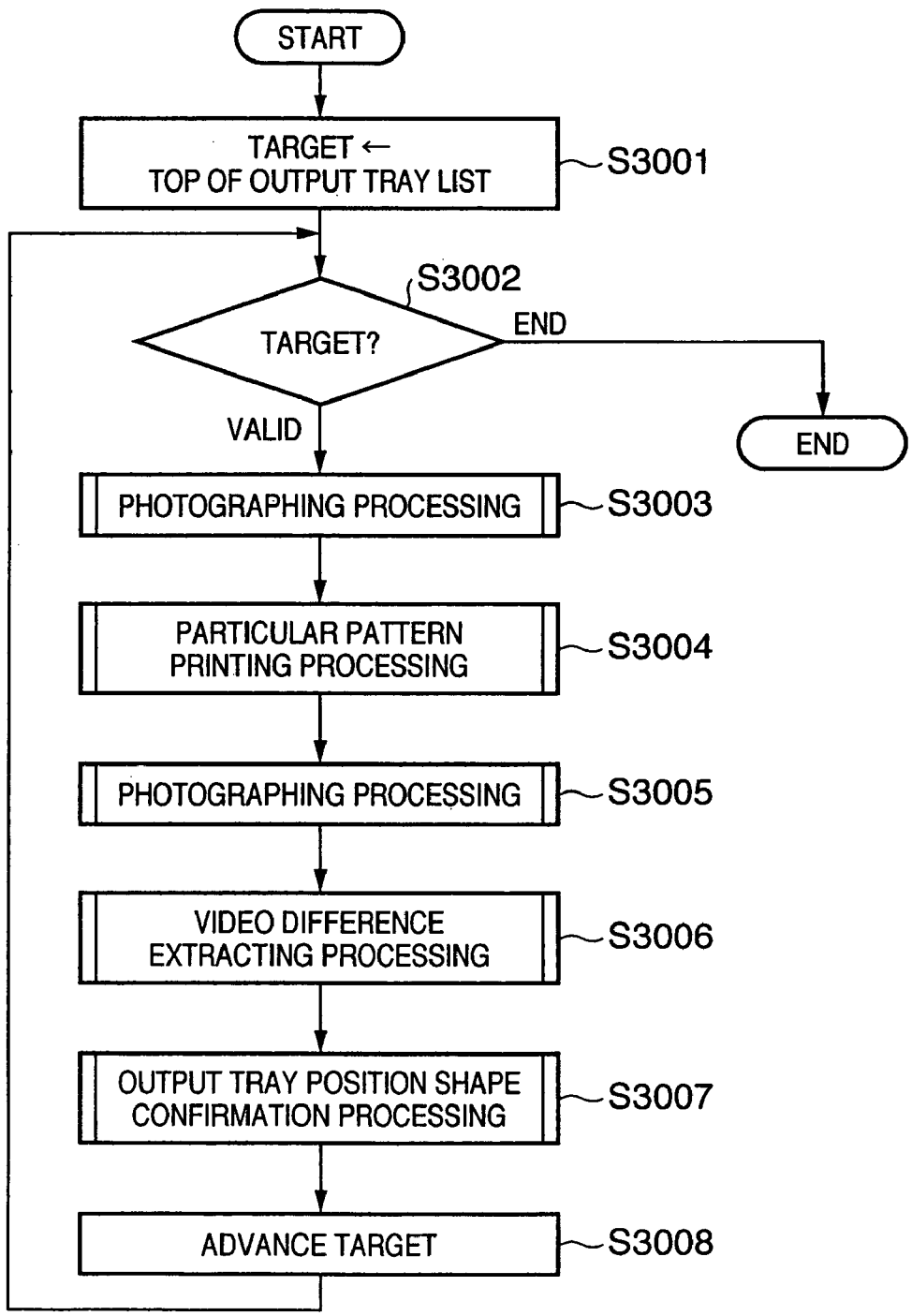
FIG. 30 is a flowchart showing position shape automatic setting processing of a printer output tray in a fifth embodiment.

FIG. 30 is a flowchart showing position shape automatic setting processing of a printer output tray in the fifth embodiment. First at the step S3001, a target is initialized to the top of an output tray list corresponding to automatic setting target appliance, and the processing after the step S3002 is repeated. The target is determined at the step S3002, and if the target is valid, the operation proceeds to the step S3003 and a video before a change of video due to the processing to be described later appears (photographing processing). Then at the step S3004, an output tray of a printer to be automatically set is caused to print a video with a particular pattern (particular pattern printing processing). As a result, a changed video is photographed at the step S3005 (photographing processing), and a difference between before and after the change is extracted at the step S3006 (video difference extracting processing). Then a position shape is estimated and set based on the difference at the step S3007 (output tray position shape confirmation processing), and the target is advanced at the step S3008, and the operation returns to the step S3002 and the abovementioned processing is repeated. On the other hand, if the target is not valid at the step S3002, the processing ends.

In such a manner, according to the fifth embodiment, a position and shape of a printer output tray particularly in a playback video can be estimated.

Sixth Embodiment

Next, by using FIG. 31 to FIG. 33, a sixth embodiment according to the present invention will be described in detail. The sixth embodiment will be described by taking an example of a case where an appliance and an object in the appliance corresponding to a designated position in a time and position in a space are identified with conference video snap shot in minutes and operation such as enlarged display, print or the like is executed.

Figure 31:
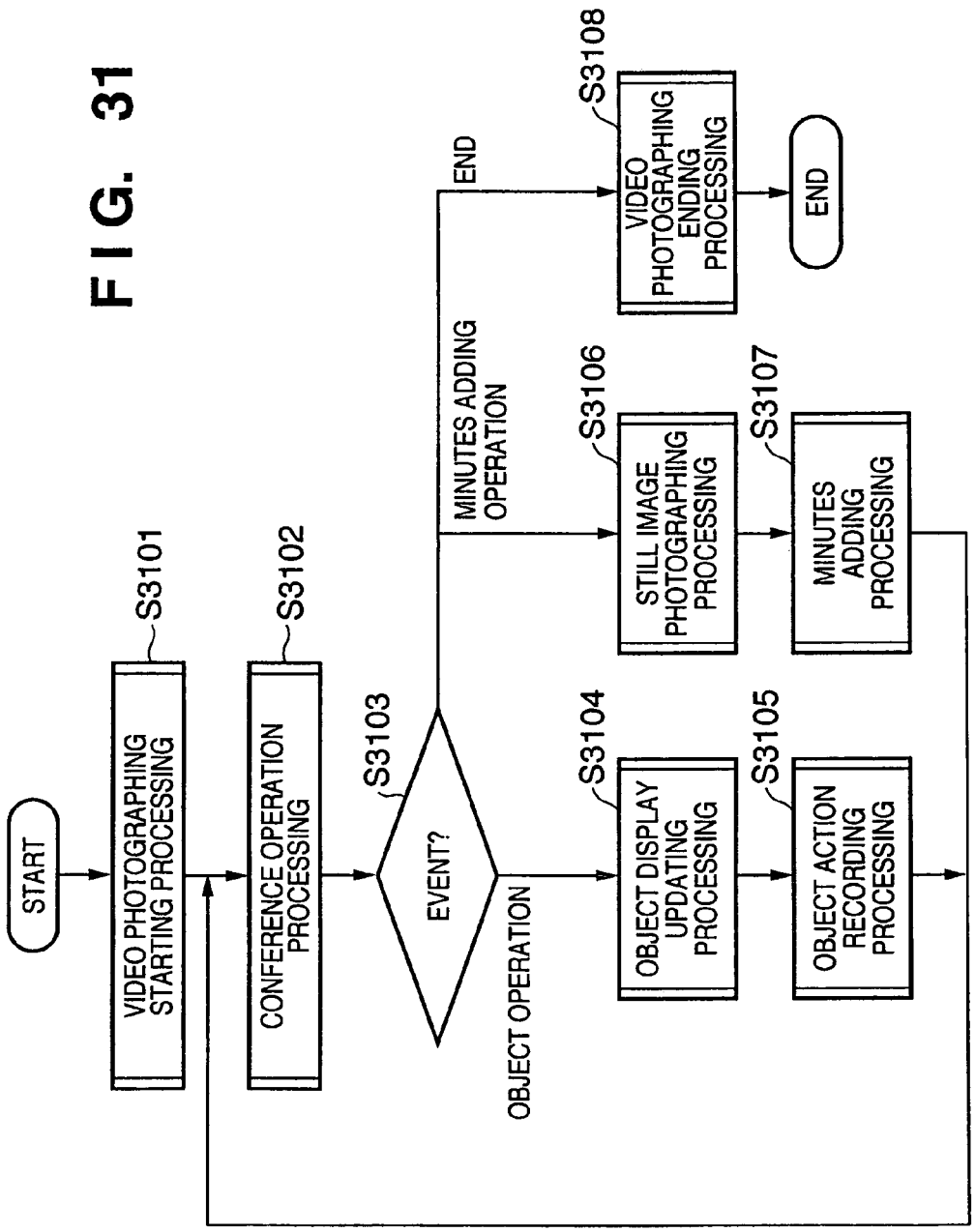
FIG. 31 is a flowchart showing conference record processing in a sixth embodiment.

FIG. 31 is a flowchart showing conference recording processing in the sixth embodiment. First, at the step S3101, recording to the abovementioned photographing video data starts (video photographing starting processing). Then, user's operation is accepted at the step S3102 (conference operation processing), and the operation is determined at the next step S3103. If the operation is object operation designation, the operation proceeds to the step S3104 and the display of the corresponding object is updated (object display updating processing). Then, the display updating action is recorded in the abovementioned object action record data at the step S3105 (object action recording processing), and the operation returns to the step S3102 and the abovementioned processing is repeated.

If the operation is designation of minutes adding operation at the step S3103, the operation proceeds to the step S3106 and a conference video at the time of designation is photographed (still image photographing processing). Then at the step S3107, minutes data including a conference video is added (minutes adding processing), and the operation proceeds to the step S3102 and the abovementioned processing is repeated. If the operation is end designation at the step S3103, the operation proceeds to the step S3108 and the photographing ends (video photographing ending processing) and the processing ends.

Figure 32:
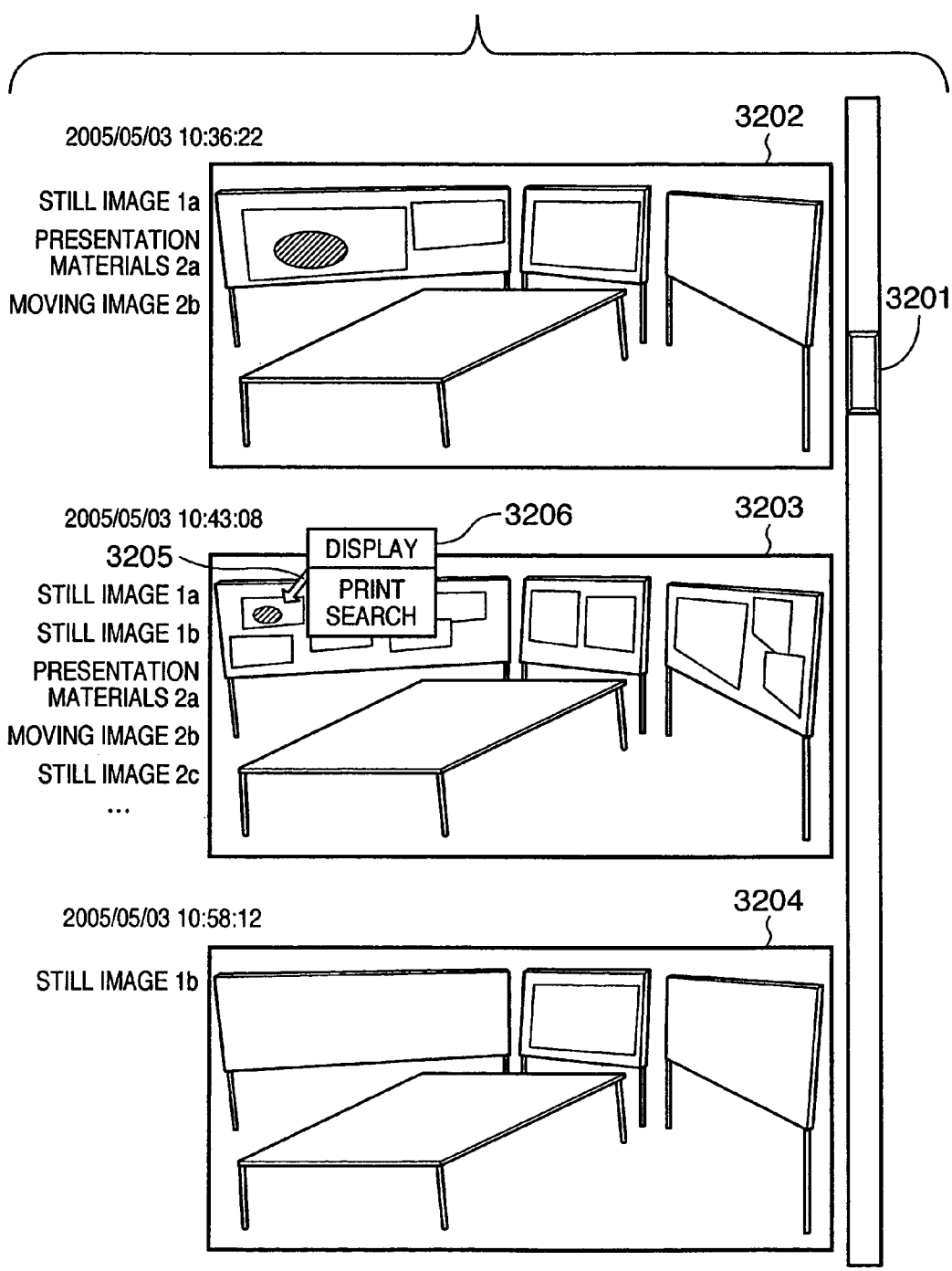
FIG. 32 is a diagram showing an example of minutes of a conference operating screen in the sixth embodiment.

FIG. 32 is a diagram showing an example of minutes operation screen in the sixth embodiment. On the minutes screen shown in FIG. 32, a time, a display object, a still image conference video 3202, 3203, 3204 at the abovementioned minutes adding operation are displayed, arranged to be operable by a scroll bar 3201. It is adapted to display operable object operation designation 3206 is displayed when operation designation is done on a display object by position specifying operation 3205 on a still conference video at an arbitrary time.

Figure 33:
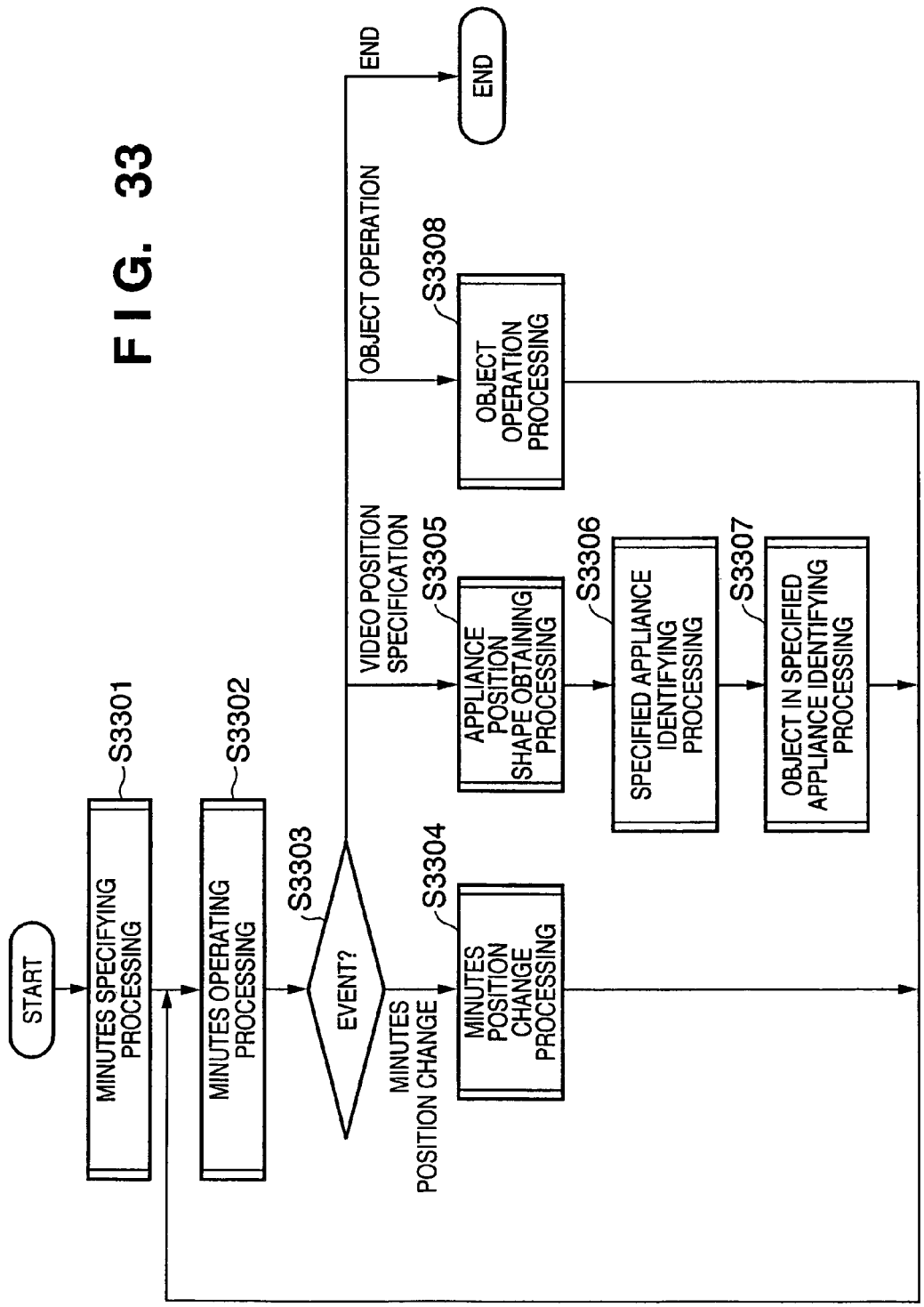
FIG. 33 is a flowchart showing minutes of a conference operating processing in the sixth embodiment.

FIG. 33 is a flowchart showing minutes operating processing in the sixth embodiment. First, minutes to be operated are designated at the step S3301 (minutes specifying processing), and operation designation is performed at the step S3302 (minutes operating processing). Then, the operation designation is determined at the step S3303, and if the operation designation is "minutes position change" designation by using the scroll bar 3201, the operation proceeds to the step S3304 and a display position of the minutes is changed (minutes position change processing). Then the operation returns to the step S3302 ante the abovementioned processing is repeated.

If the operation designation is "video position specification" designation at the step S3303, the operation proceeds to the step S3305, and appliance position shape data at a time corresponding to minutes position is obtained (appliance position shape obtaining processing). Then at the step S3306, an appliance corresponding to the specified position is identified (specified appliance identifying processing). Next at the step S3307, an object in an appliance corresponding to the specified position is identified as object action record data is referenced (object in specified appliance identifying processing), and the operation proceeds to the step S3302 and the abovementioned processing is repeated.

If the operation designation is designation of "object operation" at the step S3303, the operation proceeds to the step S3308 and operation specified to the object identified in the abovementioned procedure is executed (object operation processing). Then the operation proceeds to the step S3302, and the abovementioned processing is repeated. If the operation designation is "end" designation at the step S3303, the processing ends.

In such a manner, according to the sixth embodiment, an appliance and an object in the appliance can be identified from a snap shot of a conference video included in the minutes.

Seventh Embodiment

Next, by using FIG. 34 to FIG. 35, a seventh embodiment according to the present invention will be described in detail. The seventh embodiment is described by taking an example of a case where a conference video corresponding to an action performed in a conference is generated from information on a position or a shape of an appliance in a conference video to be generated.

Figure 34:
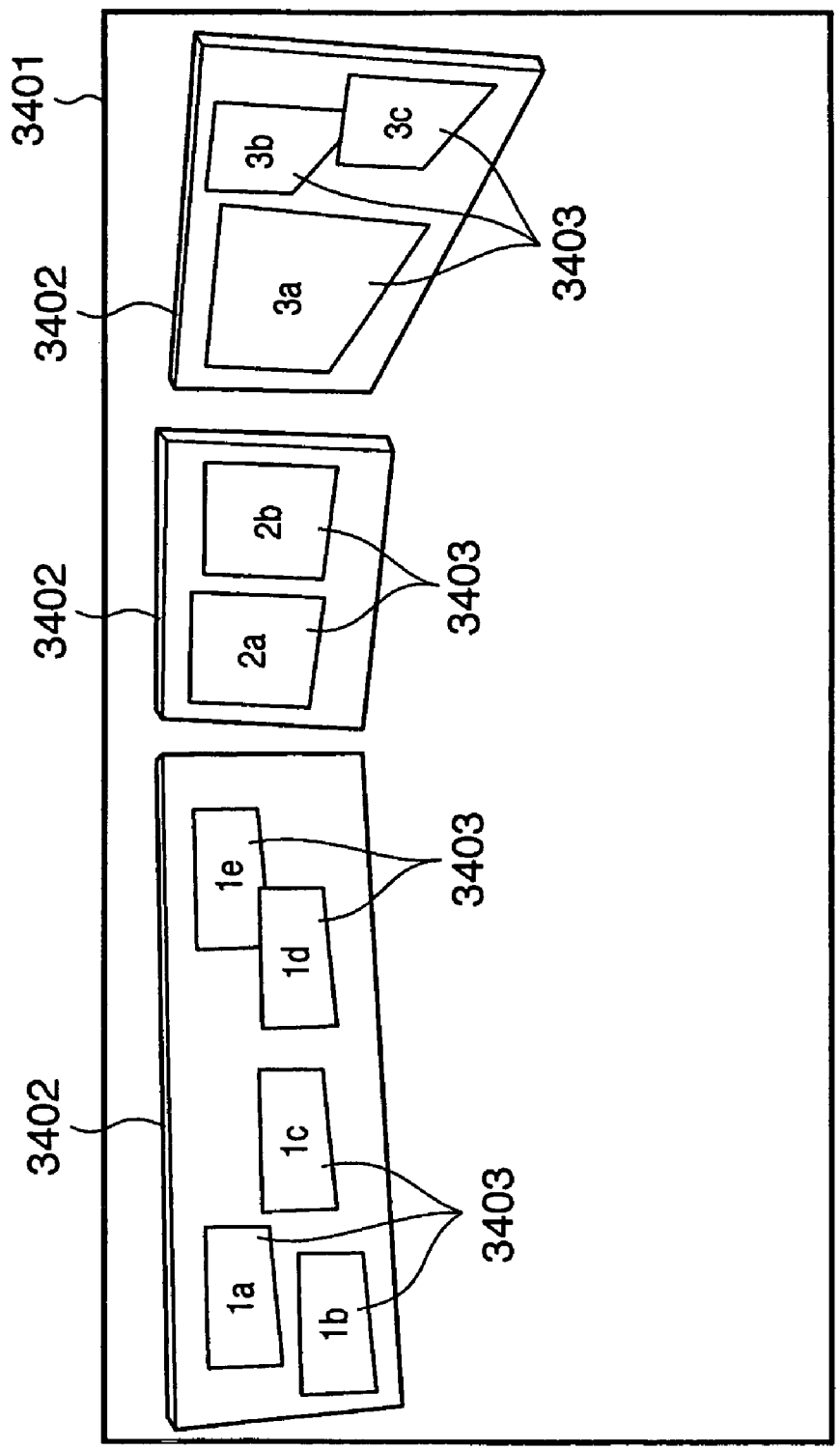
FIG. 34 is a diagram showing an example of a virtual video generated in a seventh embodiment.

FIG. 34 is a diagram showing an example of a virtual video generated by the seventh embodiment. As shown in FIG. 34, a display 3402 is placed on a conference video screen 3401 based on the abovementioned appliance position shape data, and a display object 3403 at a corresponding time is displayed based on the abovementioned object action record data.

Figure 35:
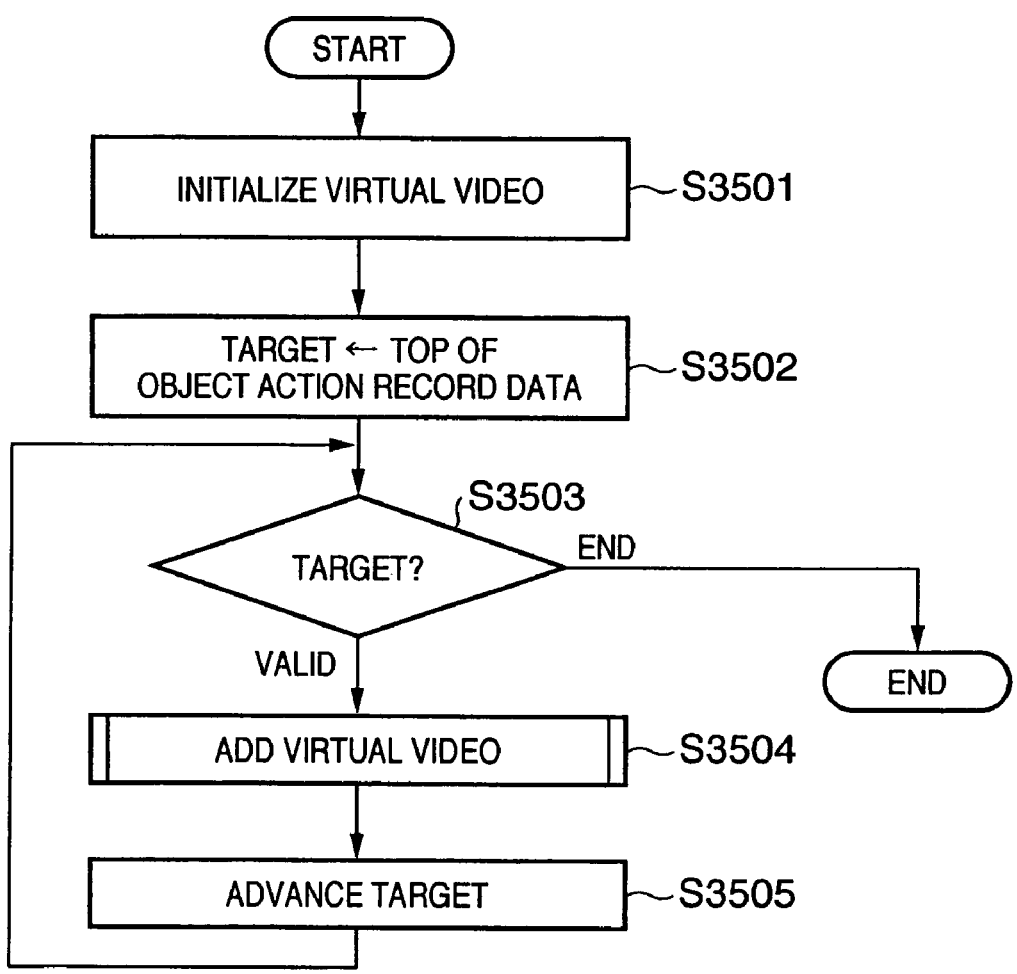
FIG. 35 is a flowchart showing virtual video generating processing in the seventh embodiment.

FIG. 35 is a flowchart showing virtual video generating processing in the seventh embodiment. First, a virtual video is initialized at the step S3501, and a target is initialized to the top of object action record data at the step S3502, and the processing after the step S3503 is repeated.

Whether a target is valid or not is determined at the step S3503, and if it is valid, the operation proceeds to the step S3504 and a virtual video at a corresponding time is added from object action record data of the target (virtual video adding processing). Then at the step S3505, the target is advanced, and the operation proceeds to the step S3502 and the abovementioned processing is repeated. On the other hand, if the target is not valid, i.e., if it ends at the step S3503, the processing ends.

In such a manner, according to the seventh embodiment, a virtual conference video can be generated.

Eighth Embodiment

Next, by using FIG. 36 to FIG. 37, an eighth embodiment according to the present invention will be described in detail. The eighth embodiment is described by taking an example of a case where an appliance and an object in the appliance corresponding to a position in a time and a position in a space designated in a playback video is identified and a video at timing when the object changes is searched for and played back.

Figure 36:
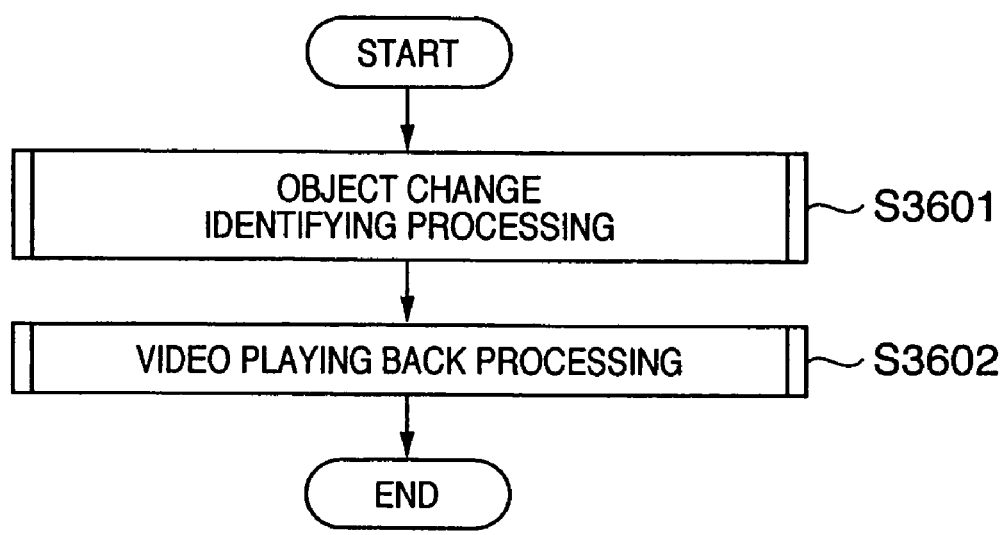
FIG. 36 is a flowchart showing object search playback processing in an eighth embodiment.

FIG. 36 is a flowchart showing object searching playback processing in the eighth embodiment. First at the step S3601, timing when object identified at a specified position is identified (object change identifying processing). Then at the step S3602, a video is played back from the timing (video playing back processing).

Figure 37:
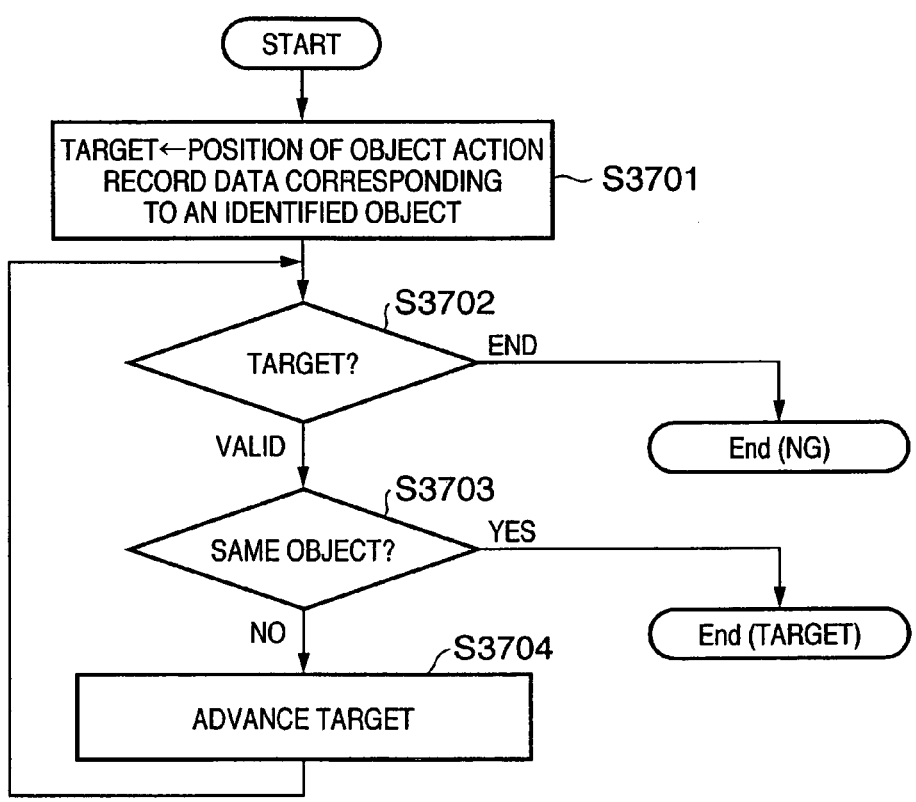
FIG. 37 is flowchart showing object change identifying processing in the eighth embodiment.

FIG. 37 is a flowchart showing object change identifying processing in the eighth embodiment. First at the step S3701, a target is initialized at a position of object action record data corresponding to an object identified at a specified position, and the processing after the step S3702 is repeated.

Whether the target is valid or not is determined at the step S3702, and if it is valid, the operation proceeds to the step S3703 and whether it is the same as the object or not is determined. As a result, if it is determined as the same, the processing ends with object action record data of a target being a return value. If it is not determined as the same, the operation proceeds to the step S3704 and the target is advanced and the operation returns to the step S3702 and the abovementioned processing is repeated. On the other hand, if the target is not valid, i.e., it ends at the step S3702, the processing ends as considering it as identifying failure.

Other than the abovementioned embodiments, it can be considered an example where, after timing when a change of a position designated from a playback video in a video is searched for, an appliance and an object in the appliance are identified by the timing and played back.

As mentioned above, according to the present invention, a video at timing when an appliance and an object in the appliance identified in a playback video changes can be played back.

The present invention may be applied to a system consisting of a plurality of appliances (for example, a host computer, an interface appliance, a reader, a printer and the like), or maybe applied to a device consisting of a single appliance (for example, a copying machine, a facsimile device or the like).

A recording medium that records software program codes for realizing functions of the abovementioned embodiments is supplied to a system or a device, whose computer (a CPU or an MPU) reads and executes the program codes stored in the recording medium. It is needless to say that the objects of the present invention can be achieved by that.

In such a case, program codes read out from the recording medium realizes functions of the abovementioned embodiments, and the recording medium storing the program codes forms the present invention.

As a recording medium for supplying the program codes, a floppy (registered trademark) disk, a hard disk, an optical disk, a magnetic optical disk, CD-ROM, CD-R, a magnetic tape, a non-volatile memory card, ROM or the like can be used.

It is needless to say that not only functions of the abovementioned embodiments are realized when program codes read out by a computer is executed, but also the cases below are included. That is to say, the case where an OS (operating system) or the like running on a computer executes a part or all the actual processing, based on designation of the program codes, and the functions of the abovementioned embodiments are realized by the processing.

Further, the program codes read out from the recording medium writes in a function extension board inserted in a computer or memory included in a function extension unit connected to a computer. Then, it is needless to say that, the function extension board or a CPU or the like included in the function extension unit executes a part or all of the actual processing based on designation of the program codes, and the processing realizes the functions of the abovementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-240197, filed Aug. 22, 2005, which is hereby incorporated by reference herein in its entirety.

What is claimed is:

1. A video processing apparatus for processing video data, comprising:

identifying means for identifying a position in a playback video corresponding to an object that is displayed in the playback video, wherein video data of the playback video is obtained by photographing an area including a location in which an appliance that outputs the object exists; and recording means for recording data indicating the identified position in the playback video so as to correspond to data for obtaining content of the object.

2. The apparatus according to claim 1, wherein said appliance is a display and the object is an image displayed on the display.

3. The apparatus according to claim 1, wherein said appliance is a printer and the object is a printed material printed by the printer.

4. An object identifying method of a video processing apparatus, comprising:

an identifying step of identifying a position in a playback video corresponding to an object that is displayed in the playback video, wherein the video processing apparatus processes video data of the playback video that is obtained by photographing an area including a location in which an appliance that outputs the object exists; and a recording step of recording data indicating the identified position in the playback video so as to correspond to data for obtaining content of the object.

5. A computer-readable recording medium storing a computer program for causing a computer to execute an object identifying method of a video processing apparatus, comprising:

an identifying step of identifying a position in a playback video corresponding to an object that is displayed in the playback video, wherein the video processing apparatus processes video data of the playback video that is obtained by photographing an area including a location in which an appliance that outputs the object exists; and a recording step of recording data indicating the identified position in the playback video so as to correspond to data for obtaining content of the object.

* * * * *